(12) United States Patent
Kusunoki et al.

(10) Patent No.: US 10,505,166 B2
(45) Date of Patent: Dec. 10, 2019

(54) ENERGY STORAGE APPARATUS

(71) Applicant: GS YUASA INTERNATIONAL LTD., Kyoto-shi (JP)

(72) Inventors: Toshiki Kusunoki, Kyoto (JP); Osamu Ushijima, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 230 days.

(21) Appl. No.: 15/620,020

(22) Filed: Jun. 12, 2017

(65) Prior Publication Data
US 2017/0279100 A1    Sep. 28, 2017

Related U.S. Application Data

(63) Continuation of application No. 14/481,408, filed on Sep. 9, 2014, now Pat. No. 9,735,407.

(30) Foreign Application Priority Data

Sep. 12, 2013  (JP) ................................ 2013-189873
Sep. 12, 2013  (JP) ................................ 2013-189874
Sep. 12, 2013  (JP) ................................ 2013-189875

(51) Int. Cl.
*H01M 2/12*     (2006.01)
*H01M 10/42*    (2006.01)
*H01M 10/0525*  (2010.01)

(52) U.S. Cl.
CPC ....... *H01M 2/1264* (2013.01); *H01M 2/1223* (2013.01); *H01M 2/1252* (2013.01);
(Continued)

(58) Field of Classification Search
CPC ........... H01M 10/0525; H01M 10/425; H01M 2220/20; H01M 2/1223; H01M 2/1252; H01M 2/1264
See application file for complete search history.

(56) References Cited

U.S. PATENT DOCUMENTS 4,177,327 A    12/1979  Mathews
5,407,760 A     4/1995  Kasner
(Continued)

FOREIGN PATENT DOCUMENTS

JP    S 57-014366 U    1/1982
JP    59-132164 U      9/1984
(Continued)

OTHER PUBLICATIONS

Japanese Office Action dated Jun. 13, 2017 for the corresponding Japanese Patent Application No. 2013-189873.
(Continued)

*Primary Examiner* — Carlos Barcena
(74) *Attorney, Agent, or Firm* — McGinn I.P. Law Group, PLLC.

(57) ABSTRACT

An energy storage apparatus includes one or more energy storage devices, and an outer housing that houses the one or more energy storage devices. The outer housing includes an outer housing main body, a cover that closes an opening of the outer housing main body, an outer terminal disposed on the cover, and a communication part defining a passageway allowing a communication between an interior and an exterior of the outer housing. The communication part includes a functional membrane. A ventilation hose for passage of a gas, which has passed the functional membrane, is connected to an end of the communication part.

20 Claims, 11 Drawing Sheets

(52) U.S. Cl.
    CPC ...... *H01M 10/0525* (2013.01); *H01M 10/425* (2013.01); *H01M 2220/20* (2013.01); *Y02E 60/122* (2013.01)

(56) References Cited

U.S. PATENT DOCUMENTS

| | | | |
|---|---|---|---|
| 5,643,691 | A | 7/1997 | Iwatsuki et al. |
| 5,981,099 | A | 11/1999 | Bourbeau |
| 6,686,720 | B2 | 2/2004 | Mittal et al. |
| 8,597,825 | B2 | 12/2013 | Buck et al. |
| 8,652,669 | B2 | 2/2014 | Nakayama et al. |
| 2003/0059669 | A1 | 3/2003 | Mittal et al. |
| 2010/0009244 | A1 | 1/2010 | Murata |
| 2010/0047673 | A1 | 2/2010 | Hirakawa et al. |
| 2011/0039153 | A1 | 2/2011 | Nakayama et al. |
| 2011/0104532 | A1 | 5/2011 | Buck et al. |
| 2011/0135979 | A1 | 6/2011 | Nakayama et al. |
| 2011/0195284 | A1 | 8/2011 | Yasui |
| 2012/0015218 | A1 | 1/2012 | Lee |
| 2014/0154535 | A1 | 6/2014 | Olsson |
| 2015/0030893 | A1* | 1/2015 | Mack .................. H01M 2/1223 429/56 |

FOREIGN PATENT DOCUMENTS

| | | |
|---|---|---|
| JP | 4-036765 U | 3/1992 |
| JP | H 4-81450 U | 7/1992 |
| JP | H 07-245089 A | 9/1995 |
| JP | H 08-171891 A | 7/1996 |
| JP | H 09-172750 A | 6/1997 |
| JP | 2001-024353 A | 1/2001 |
| JP | 2001-085974 A | 3/2001 |
| JP | 2002-323351 A | 11/2002 |
| JP | 2003-109565 A | 4/2003 |
| JP | 2003-217548 A | 7/2003 |
| JP | 2007-195311 A | 8/2007 |
| JP | 2008-071693 A | 3/2008 |
| JP | 2008-117756 A | 5/2008 |
| JP | 2008-251308 A | 10/2008 |
| JP | 2010-044879 A | 2/2010 |
| JP | 2011-523168 A | 8/2011 |
| JP | 2013-168293 A | 8/2013 |
| WO | WO 2009/140199 A2 | 11/2009 |

OTHER PUBLICATIONS

Japanese Office Action dated Jun. 13, 2017 for the corresponding Japanese Patent Application No. 2013-189874.
Japanese Office Action dated Jun. 13, 2017 for the corresponding Japanese Patent Application No. 2013-189875.
Notice of Allowance in U.S. Appl. No. 14/481,408 dated Mar. 8, 2017.
Office Action, in U.S. Appl. No. 14/481,408 dated Nov. 18, 2016.
Office Action in U.S. Appl. No. 14/481,408 dated Jul. 22, 2016.
Office Action in U.S. Appl. No. 14/481,408 dated Apr. 12, 2016.

\* cited by examiner

ENERGY STORAGE APPARATUS

The present application is a Continuation application of U.S. patent application Ser. No. 14/481,408, filed on Sep. 9, 2014, which is based on and claims priority from Japanese Patent Application No. 2013-189873 filed on Sep. 12, 2013, Japanese Patent Application No. 2013-189874 filed on Sep. 12, 2013, and Japanese Patent Application No. 2013-189875 filed on Sep. 12, 2013, the entire contents of which are incorporated herein by reference.

FIELD

The present invention relates to an energy storage apparatus including one or more energy storage devices housed in an outer housing.

BACKGROUND

Energy storage apparatuses that house non-aqueous electrolyte secondary batteries, such as lithium-ion batteries, are widely used as a main or auxiliary electrical power source for vehicles such as gasoline-powered automobiles (for example, see Japanese Unexamined Patent Application Publication No. 2007-195311). Such energy storage apparatuses include those that house a plurality of battery cells hermetically sealed in an outer housing.

When non-aqueous electrolyte secondary batteries malfunction, such as when they are overcharged or internally short circuit, a gas discharge valve (safety valve) provided on the battery cell opens and gas discharges from the safety valve into the interior of the outer housing. The energy storage apparatus includes a discharge port for discharging this gas out of the outer housing.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one aspect, the present invention provides an energy storage apparatus including an outer housing having a discharge port through which foreign matter cannot easily enter the interior of the outer housing.

An energy storage apparatus according to one aspect of the present invention includes one or more energy storage devices and an outer housing that houses the one or more energy storage devices. The outer housing includes a communication part defining a passageway allowing communication between an interior and an exterior of the outer housing, and the communication part includes a functional membrane that allows passage of gas and prohibits passage of liquid.

BRIEF DESCRIPTION OF DRAWINGS

These and other objects, advantages and features of the invention will become apparent from the following description thereof taken in conjunction with the accompanying drawings that illustrate a specific embodiment of the present invention.

Figure 1:
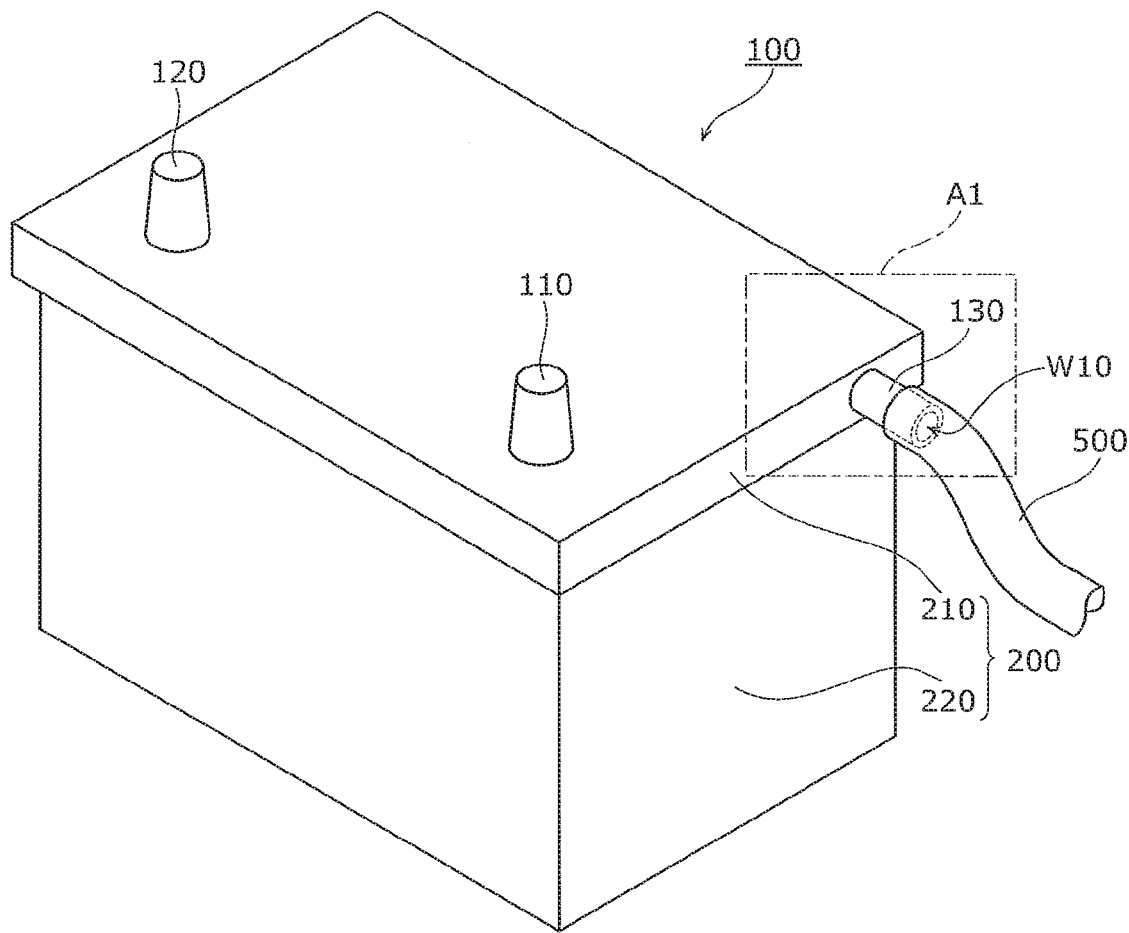
FIG. 1 is a perspective view of an energy storage apparatus according to an embodiment of the present invention.
Figure 1:
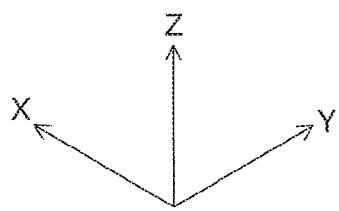

DESCRIPTION OF EMBODIMENT (Underlying Knowledge Forming Basis of the Present Invention)

With an energy storage apparatus that includes a discharge port for discharging gas out of the outer housing, such as the one described in the Background section, there is concern that foreign matter will enter the interior of the outer housing through the discharge port since the discharge port allows communication between the interior and the exterior of the outer housing.

One example of how foreign matter can enter the interior of the outer housing is as follows. The discharge port is, for example, a communication part defining a passageway that communicatively connects the interior and the exterior of the outer housing of the energy storage apparatus. As such, when, for example, the energy storage apparatus is installed in a vehicle, there is concern that foreign matter such as water will enter the interior of the outer housing of the energy storage apparatus through the passageway when, for example, the vehicle is washed using high-pressure water or when water sprays in the vicinity of the energy storage apparatus while driving.

Since water can easily flow into the interior of the outer housing of the energy storage apparatus through the discharge port when a given water pressure is applied to the outer housing, such as when the energy storage apparatus is submersed, it is necessary to prevent water from being able to flow into the interior of the outer housing.

In one aspect, the present invention provides an energy storage apparatus that includes a passageway capable of discharging gas generated in the event of a malfunction out of an outer housing of the energy storage apparatus, and through which foreign matter, such as water, cannot easily enter and water cannot easily flow into the interior of the outer housing.

An energy storage apparatus according to one aspect of the present invention includes one or more energy storage devices and an outer housing that houses the one or more energy storage devices. The outer housing includes a communication part defining a passageway allowing communication between an interior and an exterior of the outer housing, and the communication part includes a functional membrane that allows passage of gas and prohibits passage of liquid.

With this, since the functional membrane that allows the passage of gas and prohibits the passage of liquid is disposed in the communication part, it is possible to prevent foreign matter, such as water, spraying on the communication part, from entering the interior of the outer housing through the passageway, and also possible to prevent water from flowing into the interior of the outer housing through the passageway if the energy storage apparatus should become submersed, for example.

For example, the communication part may further include a pressure valve that seals the passageway in a first state and allows communication between the interior and the exterior of the outer housing through the passageway in a second state, the pressure value being in the first state when internal pressure in the interior of the outer housing is less than or equal to a predetermined pressure, and the pressure value being in the second state when the internal pressure is greater than the predetermined pressure, and the pressure valve may be disposed closer to the exterior of the outer housing than the functional membrane is in the passageway.

With this, the outer housing of the energy storage apparatus includes the pressure valve which adjusts the pressure in the interior of the outer housing by allowing communication between the interior and the exterior of the outer housing only when the interior pressure exceeds the exterior pressure, and the functional membrane which is disposed closer to the interior than the pressure valve is in the passageway and is gas permeable. The pressure valve is disposed closer to the exterior of the outer housing than the functional membrane is.

Consequently, when the energy storage devices generate gas due to, for example, a malfunction, and the interior pressure in the interior of the outer housing rises above the predetermined pressure, the pressure value enters the second state. In this case, since the pressure valve is in the second state and the functional membrane is always gas permeable, gas can be discharged out to the exterior. Moreover, since the pressure valve is in the first state under normal circumstances, it is possible to keep the interior of the outer housing in a hermetically sealed state and possible to completely prevent foreign matter from entering the interior of the outer housing from the exterior. When, for example, a given water pressure is applied to the passageway, such as when the energy storage apparatus is submersed, even though inflow of water is difficult to prevent with the pressure valve, inflow of water can be prevented with the functional membrane, which does not allow passage of liquid, so water can be prevented from flowing into the interior of the outer housing even when a given water pressure is applied to the passageway. Moreover, it is possible to prevent water from reaching the functional membrane with the pressure valve when high-pressure water sprays in the vicinity of the energy storage apparatus from, for example, a pressure washer. This makes it possible to prevent damage to the functional membrane from sprays of high-pressure water.

For example, the communication part may include a first component and a second component, the first component may define a first pathway adjacent to the interior of the outer housing in the passageway, the second component may define a second pathway adjacent to the exterior of the outer housing in the passageway, and the functional membrane may be held in place by being sandwiched between the first component and the second component.

With this, the passageway is defined by two components: the first component which defines the half closer to the interior; and the second component which defines the other half closer to the exterior and holds the pressure valve. The functional membrane is held in place by being sandwiched between the first component and the second component. Thus, it is possible to dispose the functional membrane in the passageway in a position closer to the interior than the pressure valve is with a simple configuration.

For example, the first component and the second component may be coupled together by an outer surface of one of the first component and the second component being screwed together with an inner surface of another of the first component and the second component.

With this, since the first component and the second component screw together, it is possible to securely couple the first component and the second component with a simple configuration.

For example, the inner surface of the another of the first component and the second component may include an inner face opposing an end of the one of the first component and the second component, and the functional membrane may be held in place by being sandwiched between (i) the end of the one of the first component and the second component and (ii) the inner face of the another of the first component and the second component.

With this, the functional membrane is held in place by being sandwiched between (i) the end of the one of the first component and the second component which are screwed together and (ii) the inner face of the another of the first component and the second component. This makes it possible to securely hold the functional membrane in place with a simple configuration.

For example, the communication part may further include a ring-shaped gasket sandwiched between the first component and the second component for sealing a space between the first component and the second component.

With this, since the gasket is disposed between the first component and the second component, it is possible to more securely couple the first component and the second component together. This in turn makes it possible to prevent water from entering the interior of the outer housing through the joint of the first component and the second component in the event of, for example, a given water pressure being applied to the passageway, such as when the energy storage apparatus is submersed.

An energy storage apparatus according to another aspect of the present invention includes one or more energy storage devices including a non-aqueous electrolyte and an outer housing that houses the one or more energy storage devices. The outer housing includes a communication part that extends in at least a first direction and defines a passageway allowing communication between an interior and an exterior of the outer housing, and the communication part includes a shield component arranged so as to completely obstruct a view through the passageway in the first direction.

With this, since the shield component is arranged in the communication part of the outer housing so as to completely obstruct a view through the passageway in the first direction, foreign matter spraying at the communication part of the outer housing can be kept from entering the interior of the outer housing.

For example, the shield component may include a plurality of shield plates.

Consequently, when foreign matter sprays into the communication part from outside the outer housing of the energy storage apparatus, even if foreign matter spays in a region other than the region blocked by the outermost shield plate, the next shield plate can block the spraying foreign matter. In other words, this structure makes it possible to further reduce the possibility of foreign matter entering the interior of the outer housing.

For example, each of the shield plates may be inclined such that a free end thereof is positioned further away from the outer housing than a fixed end thereof.

Consequently, even if foreign matter enters the communication part from outside the outer housing of the energy storage apparatus, in the communication part, foreign matter that hits a shield plate can easily move toward the fixed end of the shield plate. The fixed ends of the shield plates block the path into the outer housing, and foreign matter cannot enter the interior of the outer housing unless it moves toward the free end. In other words, this structure makes it possible to further reduce the possibility of foreign matter entering the interior of the outer housing.

For example, the shield plates may include a first shield plate and a second shield plate, the first shield plate may be arranged so as to obstruct a view through a first region of the passageway in the first direction, the first region being a portion of the passageway in a second direction intersecting the first direction, and the second shield plate may be arranged so as to be offset in the first direction from the first shield plate and obstruct a view through a second region of the passageway in the first direction, the second region being a remaining portion of the passageway in the second direction.

Consequently, even if foreign matter enters the communication part from outside the outer housing of the energy storage apparatus, so long as the foreign matter does not change its course of travel in the communication part and maneuver past the shield plates, the foreign matter cannot enter the interior of the outer housing. In other words, this structure makes it possible to further reduce the possibility of foreign matter entering the interior of the outer housing.

For example, the shield plates may include a first shield plate and a second shield plate, the first shield plate may be arranged so as to obstruct a view through a first region of the passageway in the first direction, the first region being a portion of the passageway and including a central axis of the passageway, and the second shield plate may be arranged so as to be offset in the first direction from the first shield plate and obstruct a view through a second region of the passageway in the first direction, the second region being a portion of the passageway and surrounding the first region.

Consequently, even if foreign matter enters the communication part from outside the outer housing of the energy storage apparatus, so long as the foreign matter does not split so as to maneuver past the central shield plate and then move back to the center, the foreign matter cannot enter the interior of the outer housing. In other words, this structure makes it possible to further reduce the possibility of foreign matter entering the interior of the outer housing.

For example, the shield component may be a helicoidal component that defines a helical space in the passageway.

Consequently, even if foreign matter enters the communication part from outside the outer housing of the energy storage apparatus, so long as the foreign matter does not rotate through the helical space, the foreign matter cannot enter the interior of the outer housing. In other words, this structure makes it possible to further reduce the possibility of foreign matter entering the interior of the outer housing.

For example, the communication part may further include a water-resistant membrane disposed closer to the interior of the outer housing than the shield component is.

Consequently, a large amount of water can be prevented from flowing into the interior of the outer housing with the water-resistant membrane, which is difficult to prevent with the shield component.

For example, the water-resistant membrane may seal the interior of the outer housing by sealing the passageway, and may break when the internal pressure exceeds a predetermined pressure to allow communication through the passageway.

With this, since the water-resistant membrane breaks when the internal pressure exceeds the predetermined pressure to allow communication through the passageway, gas generated by the energy storage devices due to a malfunction in the energy storage devices can be released from the interior of the outer housing out to the exterior through the passageway.

Next, a different example of foreign matter entering the interior of the outer housing will be given. The energy storage apparatus needs to prevent water from flowing into the outer housing of the energy storage apparatus in the event that the energy storage apparatus should become submerged. If the outer housing is completely hermetically sealed to waterproof it, changes in temperature or ambient pressure cause the internal pressure in the outer housing to fluctuate, placing stress on the outer housing. Consequently, there is a concern that this will cause a fissure to form in the outer housing.

In order to mitigate pressure fluctuations in the interior of the outer housing, provision of a functional membrane which permits the passage of gas and prohibits the passage of liquid is conceivable. However, when gas generates in the event of a malfunction, there is concern that the functional membrane can easily become clogged by melted resin, such as film from the batteries, that makes its way to the discharge port along with the gas, thereby obstructing the discharge of gas.

In another aspect, the present invention provides an energy storage apparatus capable of preventing water from entering an interior of an outer housing through a communication part, mitigating stress applied to the outer housing, and discharging gas generated in the event of a malfunction from the communication part.

An energy storage apparatus according to another aspect of the present invention includes one or more energy storage devices and an outer housing that houses the one or more energy storage devices. The outer housing includes an opening that allows communication between an interior and an exterior of the outer housing, the opening is sealed by a first pressure adjuster and a second pressure adjuster arranged complementary to each other, the first pressure adjuster allows passage of gas and prohibits passage of liquid, and the second pressure adjuster prohibits passage of gas and liquid, and releases internal pressure in the interior of the outer housing when the internal pressure exceeds a predetermined pressure.

With this, since the first pressure adjuster that allows passage of gas and prohibits passage of liquid and the second pressure adjuster that prohibits passage of gas and liquid are disposed in the opening formed in the outer housing, water can be prevented from entering the interior of the outer housing through the opening. Moreover, even if the pressure fluctuates in the interior of the outer housing due to a change in temperature or ambient pressure, since the first pressure adjuster allows the passage of gas, pressure fluctuations in the interior of the outer housing can be mitigated. In other words, water can be prevented from entering the interior of the outer housing through the opening and stress on the outer housing can be mitigated. Furthermore, since the second pressure adjuster breaks when internal pressure in the interior of the outer housing exceeds the predetermined pressure when a large amount of gas is generated by the energy storage devices in the event of a malfunction, for example, gas generated in the event of a malfunction can be efficiently discharged from the opening of the outer housing.

For example, the first pressure adjuster may have a surface area facing the opening that is less than a surface area of the second pressure adjuster facing the opening.

With this, since the first pressure adjuster permits the passage of gas even when the first pressure adjuster is smaller than the second pressure adjuster, pressure fluctuation in the interior of the outer housing due to a change in temperature or ambient pressure can be mitigated by the functional membrane. Moreover, since the first pressure adjuster is gas permeable, when gas is generated in the event of a malfunction, melted resin tends to be carried by the gas and collect at the first pressure adjuster. When the melted resin attaches to the first pressure adjuster and cools, thereby making the first pressure adjuster a hardened wall of resin, there is concern that the opening will be sealed off. Consequently, by making the first pressure adjuster smaller than the second pressure adjuster, the effect this resin carried by the gas has can be reduced, and by the second pressure adjuster breaking when the internal pressure in the outer housing exceeds the predetermined pressure, the opening opens up, whereby gas can efficiently be discharged from the opening.

For example, the outer housing may further include a communication part disposed around the opening, on an exterior side of the outer housing, the communication part defining a passageway extending in a first direction, and the communication part may include at least one shield plate arranged so as to completely obstruct a view through the passageway in the first direction, the shield plate disposed further away from the outer housing than the first pressure adjuster and the second pressure adjuster.

With this, since the at least one shield plate is arranged in the communication part of the outer housing so as to completely obstruct a view through the passageway in the first direction, foreign matter spraying at the communication part of the outer housing can be kept from entering the interior of the outer housing.

For example, the second pressure adjuster may be a membrane that breaks to release the internal pressure.

With this, since the second pressure adjuster is a membrane that is, for example, a film, and breaks when the internal pressure exceeds the predetermined pressure, this configuration can be achieved simply and at a low cost.

For example, the second pressure adjuster may be a pressure valve that seals a second region of the opening in a first state and allows communication between the interior and the exterior of the outer housing through the second region in a second state, the pressure valve being in the first state when the internal pressure is less than or equal to the predetermined pressure, the pressure value being in the second state when the internal pressure is greater than the predetermined pressure, and the second region being a remaining region of the opening excluding a first region sealed by the first pressure adjuster.

With this, since the second pressure adjuster is a pressure valve which enters a second state which allows communication between the interior and the exterior when the interior pressure exceeds the predetermined pressure, and the pressure valve is in the second state when not in the first state, it is possible to realize a configuration in which gas can be discharged from the interior with the second pressure adjuster only in the event of a malfunction in the energy storage apparatus that causes the internal pressure to increase.

Hereinafter, an exemplary embodiment is described in greater detail with reference to the accompanying drawings. It should be noted that each exemplary embodiment described below shows a preferred, specific example of the present invention. The numerical values, shapes, materials, structural elements, the arrangement and connection of the structural elements etc. shown in the following exemplary embodiments are mere examples, and therefore do not limit the present invention. As such, among the structural elements in the following exemplary embodiments, structural elements not recited in any one of the independent claims are described as arbitrary structural elements of a preferred embodiment.

Embodiment 1

Figure 2:
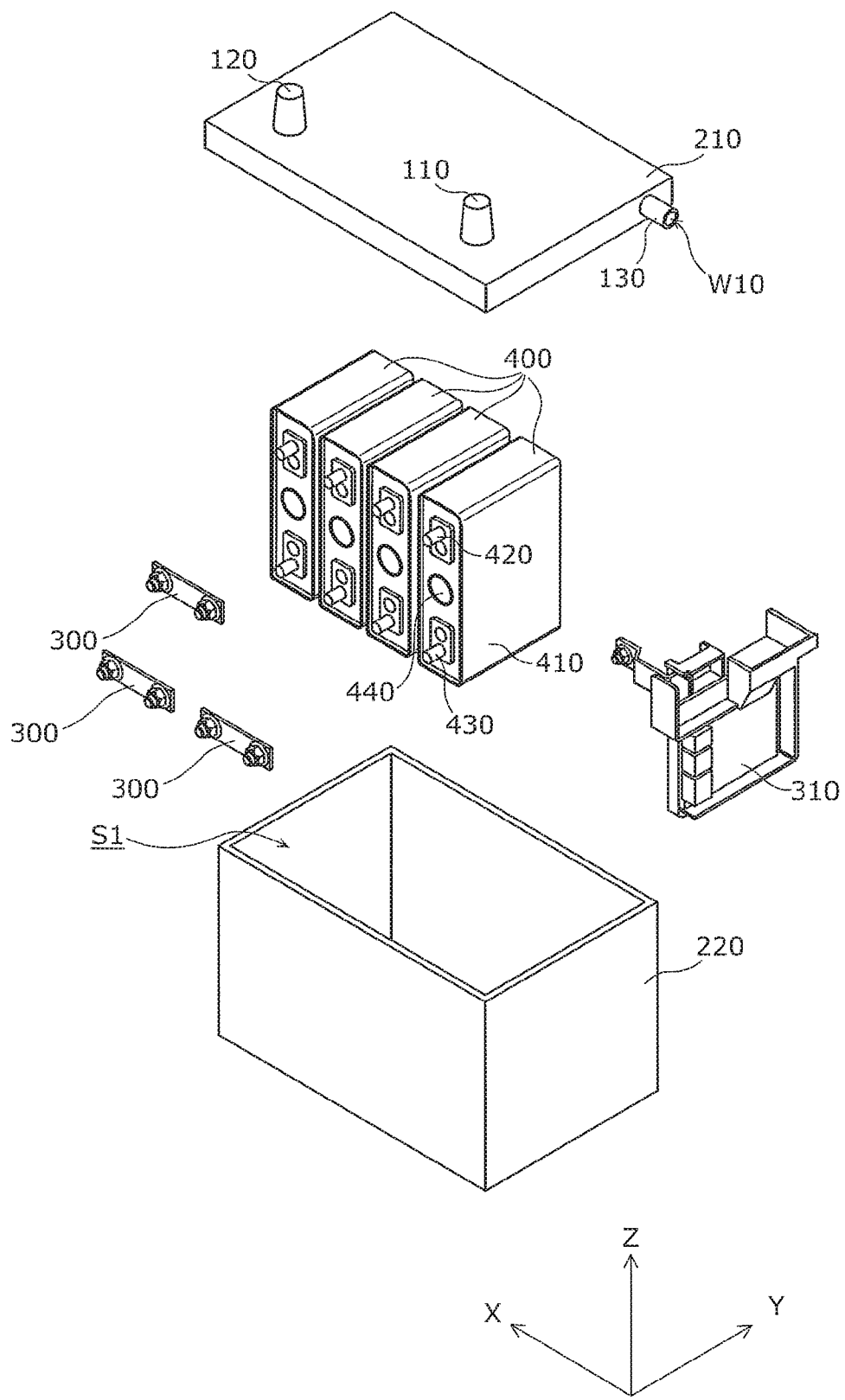
FIG. 2 is an exploded perspective view of the energy storage apparatus.
Figure 3:
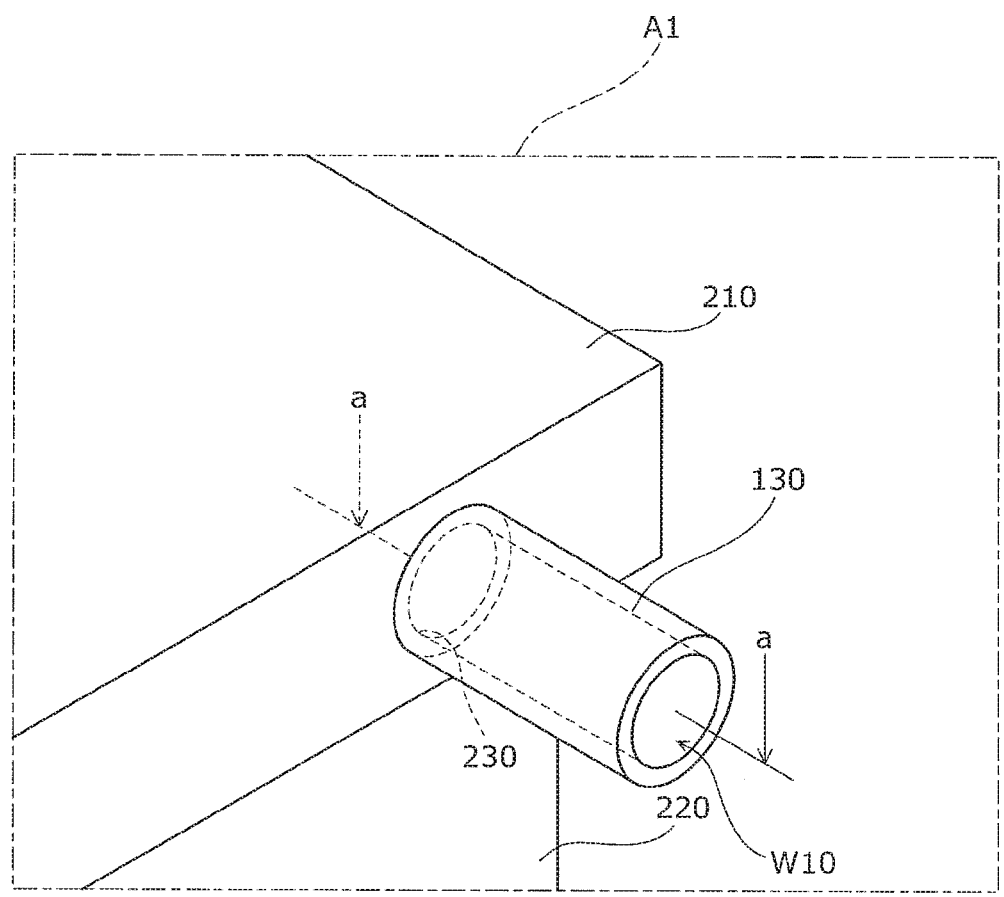
FIG. 3 is an enlarged view of region A1 illustrated in FIG. 1.

FIG. 1 is a perspective view of an energy storage apparatus according to Embodiment 1 of the present invention. FIG. 2 is an exploded perspective view of the energy storage apparatus. FIG. 3 is an enlarged view of the region A1 illustrated in FIG. 1.

It should be noted that the Z axis is shown as being the vertical direction in these figures. The Z axis is exemplified as being the vertical direction in the following description as well, but depending on the mode of use, it is conceivable that the Z axis may be a direction other than the vertical direction. As such, the Z axis is not limited to the vertical direction. Additionally, in these figures, the positive direction of each of the X axis, the Y axis, and the Z axis is indicated by the direction in which the arrow points, and the negative direction is the opposite direction. The same applies to other figures as well.

As is illustrated in these figures, the energy storage apparatus 100 includes an outer housing 200, a plurality of bus bars 300, and a plurality (four in Embodiment 1) of energy storage devices 400.

The outer housing 200 is a box-shaped component that houses the plurality of energy storage devices 400. The outer housing 200 defines a hermetically sealed interior space S1, and houses the plurality of energy storage devices 400 in the interior space S1. The outer housing 200 includes a closed-ended rectangular tube-shaped outer housing main body 220 and a cover 210 that seals the opening of the outer housing main body 220. The outer housing main body 220 arranges the plurality of energy storage devices 400 in predetermined positions along the X axis, protects each energy storage device 400 from impact and such, and keeps each energy storage device 400 from unintentionally contacting metal components and such. The outer housing 200 is made from an insulating material such as resin.

The outer housing 200 also includes an outer positive terminal 110 and an outer negative terminal 120. The outer positive terminal 110 and the outer negative terminal 120 are terminals connected to an external load to supply power stored in the energy storage apparatus 100 to the external load or terminals connected to an external power source to store energy supplied from the external power source in the energy storage apparatus 100.

The cover 210 includes an opening 230 that allows communication between the interior space S1 formed in the outer housing 200 and outside the outer housing (hereinafter referred to as exterior space S2). The outer housing 200 further includes a communication part 130 disposed around the opening 230, on an exterior side of the outer housing 200, and defines a cylindrical passageway W10 extending along the X axis (the first direction (predetermined direction)). It should be noted that a ventilation hose 500, for example, which is in communication with the ambient, is connected to the terminal end of the communication part 130 (the outer end of the communication part 130). The communication part 130 is not limited to extending from the outer housing 200 along the X axis, and may extend along the Y axis or the Z axis, or in another direction. Moreover, the communication part 130 is formed on the cover 210, but it may be formed on the outer housing main body 220. In other words, it is sufficient so long as the communication part 130 is formed on the outer housing 200; the location in which the communication part 130 is formed on the outer housing 200 is not limited to a specific example.

The energy storage device 400 is capable of charging and discharging electricity, and includes an electrically conductive case 410, a positive terminal 420, and a negative terminal 430. The energy storage device 400 is a secondary battery including a non-aqueous electrolyte, and is, for example, a lithium-ion secondary battery. It should be noted that a capacitor may be used instead of a lithium-ion secondary battery as the energy storage device 400. The case 410 of the energy storage device 400 includes a safety valve 440 for discharging gas generated inside the case 410 in the event of a malfunction, such as when the energy storage device 400 is overcharged or internally short circuits. The positive terminal 420 and the negative terminal 430 protrude from the top of the case 410. The plurality of energy storage devices 400 are aligned along the X axis on their longitudinal ends such that the tops of the cases 410 face the Y axis direction.

Two opposite polarity terminals of different ones the energy storage devices 400 are electrically connected together with a bus bar 300, which is a metal plate-like component. In other words, the plurality of energy storage devices 400 are connected in series by the bus bars 300. The positive electrode of the plurality of energy storage devices 400 connected in series by the bus bars 300 is connected to the positive terminal 110, and the negative electrode is connected to the outer negative terminal 120 via a circuit substrate 310.

The circuit substrate 310 is housed in the interior space S1 in the outer housing main body 220, adjacent to an outermost one of the energy storage devices 400 in the alignment direction (along the X axis). The circuit substrate 310 monitors the electrical state, such as the charge or discharge state, of the plurality of energy storage devices 400, and controls the charging and discharging of the plurality of energy storage devices 400.

Figure 4:
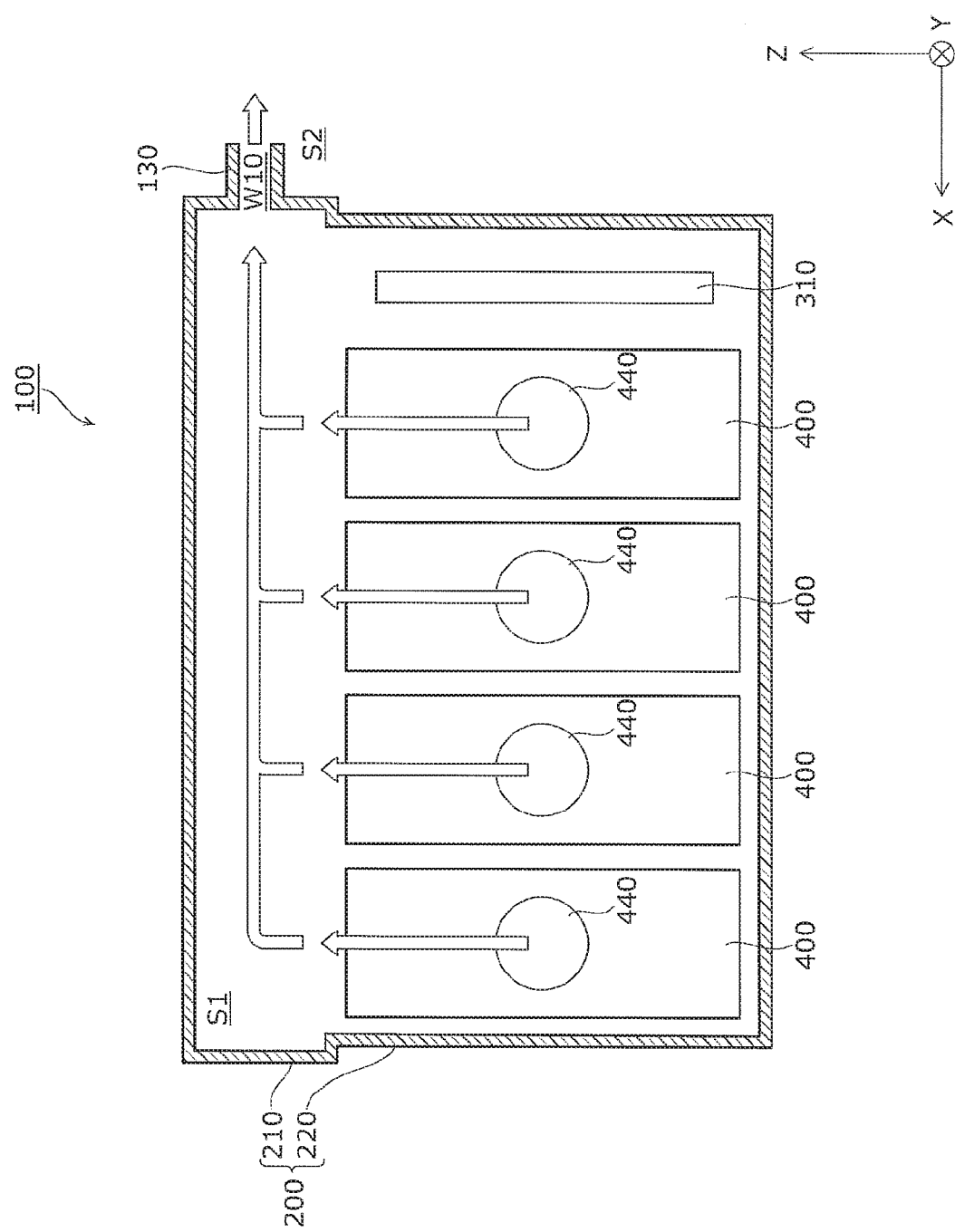
FIG. 4 illustrates the flow of gas discharging from the interior of an outer housing of the energy storage apparatus when a malfunction occurs that causes energy storage devices to generate gas.
Figure 5:
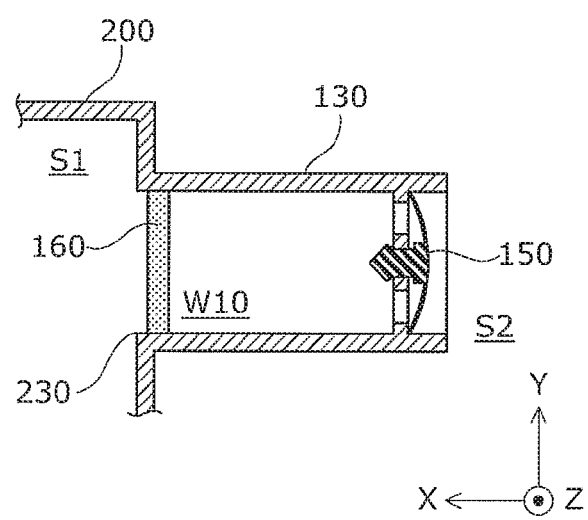
FIG. 5 illustrates the structure of a passageway of the outer housing.

Next, the communication part 130 will be described with reference to FIG. 4 and FIG. 5. FIG. 4 illustrates the flow of gas discharging from the interior of the outer housing of the energy storage apparatus when a malfunction occurs that causes the energy storage devices to generate gas. FIG. 5 illustrates the structure of the passageway of the outer housing.

It should be noted that the energy storage apparatus 100 is a battery used as starter battery for starting a vehicle or an auxiliary battery in an electric vehicle, and can be used in applications requiring a battery having a voltage rating of no less than 10 V and no more than 16 V (for example, 12 V), and can particularly be used in applications requiring a battery conforming to an ISO water protection standard (for example IPX6K).

As is illustrated in FIG. 5, the communication part 130 includes a pressure valve 150 and a functional membrane 160. The pressure valve 150 is in a first state in which the passageway W10 is sealed when the pressure in the interior space S1 is less than or equal to a predetermined pressure, and in a second state in which communication exists between the interior space S1 and the exterior space S2 in the passageway W10 when the pressure in the interior space S1 is greater than a predetermined pressure. The pressure valve 150 is preferably a reset valve. In Embodiment 1, the pressure valve 150 is an umbrella valve. Reset valves such as umbrella valves function as check valves which permit flow in one direction and block flow in the other direction. The structure of the pressure valve 150 will be described in detail later. It should be noted that a reset valve is a valve capable of adjusting the pressure between the interior space S1 and the exterior space S2 multiple times to equalize the pressure between the interior space S1 and the exterior space S2. Although the pressure valve 150 is preferably a reset valve, it should be noted that the pressure valve 150 is not limited to a reset valve. The functional membrane 160 is disposed closer to the interior space S1 than the pressure valve 150 in the passageway W10, and allows passage of gas and prohibits passage of liquid. The functional membrane 160 is made from a water resistant, permeable material such as GORE-TEC (registered trademark) or TEMISH (registered trademark).

The pressure valve 150 enters a second state in which communication exists between the interior space S1 and the exterior space S2 when gas generated by the energy storage devices 400 in the event of a malfunction fills the interior space S1 and the pressure in the interior space S1 exceeds a predetermined pressure. In other words, in the event of a malfunction, the pressure valve 150 enters the second state, and since the functional membrane 160 allows for passage of gas, gas generated by the energy storage devices 400 can be released from of the interior space S1 of the outer housing 200 to the exterior space S2 through the passageway W10, as indicated by the arrows in FIG. 4.

Figure 6:
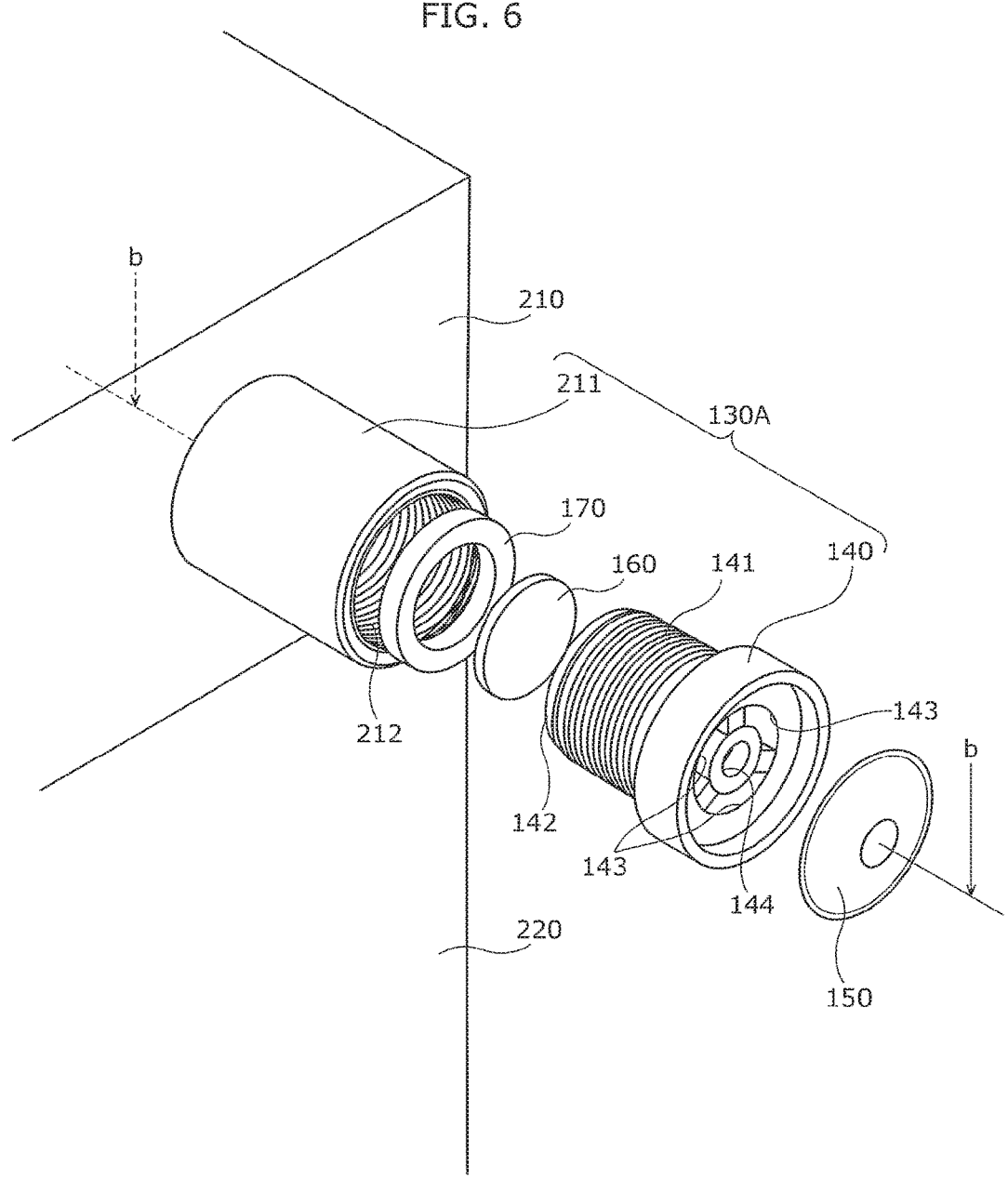
FIG. 6 illustrates a specific example for achieving a configuration in which a pressure valve is disposed closer to the exterior than a functional membrane in the passageway and the functional membrane is disposed closer to the interior than the pressure valve.

FIG. 6 illustrates a specific example for achieving a configuration in which the pressure valve is disposed closer to the exterior space S2 than the functional membrane in the passageway and the functional membrane is disposed closer to the interior space S1 than the pressure valve. FIG. 6 is an exploded perspective view of a communication part 130A. It should be noted that the communication part 130A illustrated in FIG. 6 is one embodiment of the communication part 130 illustrated in FIG. 1 through FIG. 4.

Figure 7:
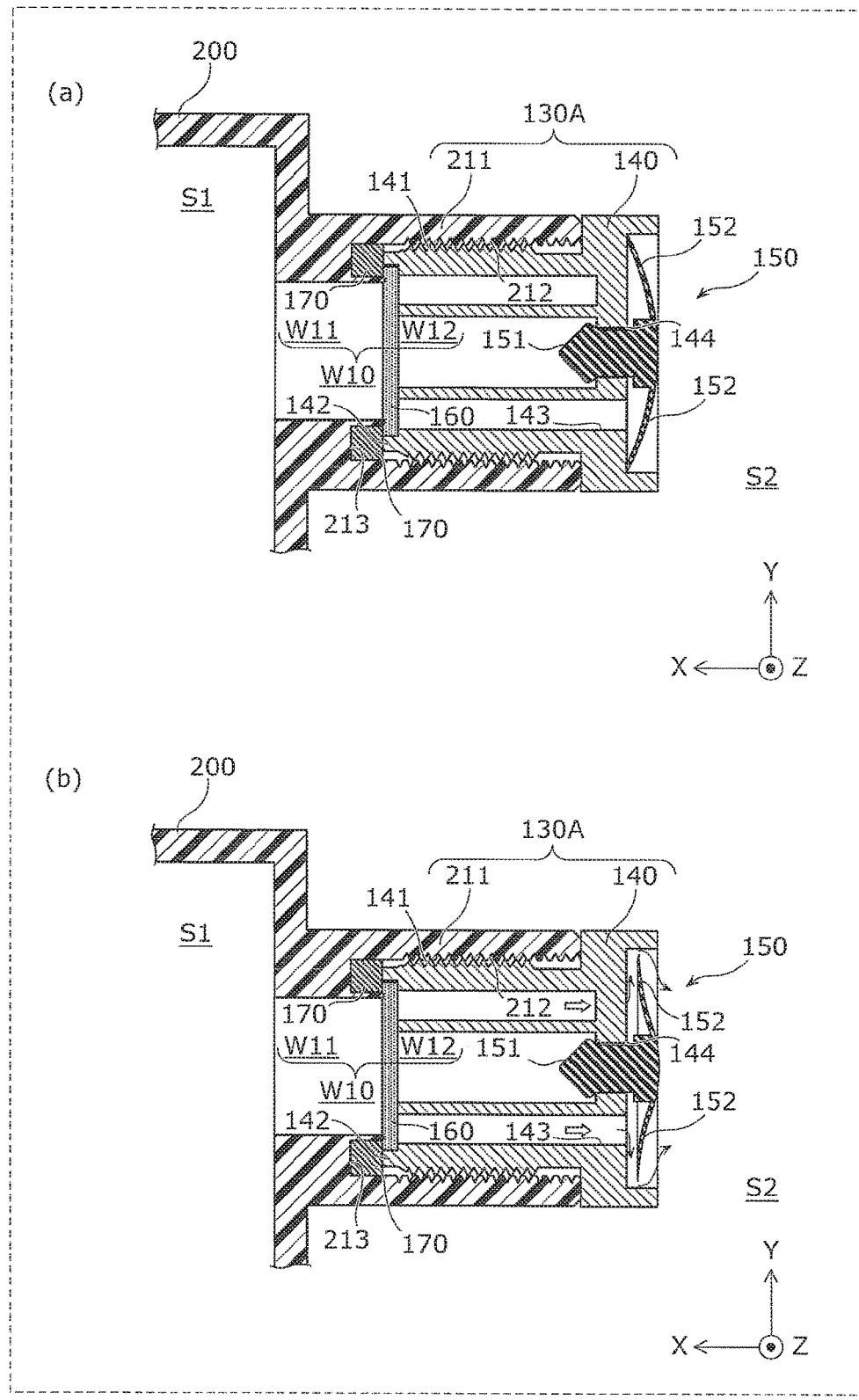
FIG. 7 is a cross-sectional view taken along line b-b in FIG. 6 in an assembled state.

FIG. 7 is a cross-sectional view taken along line b-b in FIG. 6 in an assembled state.

As is illustrated in FIG. 6 and FIG. 7, the communication part 130A includes a first component 211 and a second component 140. The first component 211 defines a first pathway W11 adjacent to the interior space S1 of the outer housing 200. The second component 140 is connected to the exterior space S2 side end of the first component 211. The second component 140 defines a second pathway W12 adjacent to the exterior space S2 exterior to the outer housing 200. The second component 140 holds the pressure valve 150 in the second pathway W12. The first component 211 and the second component 140 are both cylindrical components, and the outer surface 141 of the second component 140 couples with the inner surface 212 of the first component 211. Female threads are formed in the inner surface 212 of the first component 211. Male threads are formed in the outer surface 141 of the second component 140. In other words, the first component 211 and the second component 140 couple together as a result of the inner surface 212 of the first component 211 and the outer surface 141 of the second component 140 screwing together. The inner wall of the first component 211 includes an inner face 213 that faces the X axis direction and opposes an end 142 of the second component 140, which is the interior space S1 side end of the second component 140. The communication part 130A further includes a gasket 170 disposed between the inner face 213 of the first component 211 and the end 142 of the second component 140. The gasket 170 is a ring-shaped component for sealing a space between the first component 211 and the second component 140, and is sandwiched by the first component 211 and the second component 140. The functional membrane 160 is held in place by being sandwiched between the inner face 213 of the first component 211 and the end 142 of the second component 140 via the gasket 170.

Here, with reference to FIG. 7, the structure of the pressure valve 150, which is an umbrella valve, will be described in detail. (a) in FIG. 7 is a cross-sectional view showing the pressure valve 150 in the first state, and (b) in FIG. 7 is a cross-sectional view showing the pressure valve 150 in the second state.

As is illustrated in FIG. 7, the pressure valve 150 includes an axial portion 151 and an umbrella portion 152 that extends radially from an end of the axial portion 151 into an umbrella shape. An opening 143 and a through-hole 144 are formed at the boundary between the interior space S1 and the exterior space S2 where the pressure valve 150 is positioned. The axial portion 151 of the pressure valve 150 passes through the through-hole 144. In other words, the pressure valve 150 is fixed in a predetermined position as a result of the axial portion 151 passing through the through-hole 144. A plurality of openings 143 are formed around the through-hole 144. The openings 143 are sealed by the umbrella portion 152 of the pressure valve 150.

When the difference in pressure between the interior space S1 exterior space S2 is less than or equal to a predetermined pressure difference (normal circumstance), the umbrella portion 152 of the pressure valve 150 seals the opening 143, as is illustrated in (a) of FIG. 7. When the difference in pressure between the interior space S1 exterior space S2 is greater than a predetermined pressure difference (malfunction), the umbrella portion 152 of the pressure valve 150 separates from the opening 143, as is illustrated in (b) of FIG. 7, whereby the interior space S1 and the exterior space S2 are in communication. In other words, when the pressure in the interior space S1 is a predetermined pressure or less, the pressure valve 150 is in the first state in which the pressure valve 150 seals the opening 143, and when the pressure in the interior space S1 is greater than the predetermined pressure, the pressure valve 150 is in the second state in which the interior space S1 and the exterior space S2 are in communication through the opening 143. By entering the second state, the pressure valve 150 adjusts the pressure in the interior space S1 by bringing it closer to the pressure in the exterior space S2 exterior to the outer housing 200, and functions as a reset valve capable of repeatedly switching between the first state and the second state. It should be noted that "predetermined pressure" refers to a pressure greater than the pressure in the exterior space S2 exterior to the outer housing 200. It should be noted that this predetermined pressure varies depending on the shape and material of the pressure valve 150, and it is possible to select the pressure valve 150 based on a desired predetermined pressure.

With the energy storage apparatus 100 according to Embodiment 1, the outer housing 200 of the energy storage apparatus 100 includes (i) the pressure valve 150 which adjusts the pressure in the interior space S1 of the outer housing 200 by allowing communication between the interior space S1 and the exterior space S2 exterior to the outer housing 200 only when the pressure in the interior space S1 exceeds the pressure in the exterior space S2, and (ii) the functional membrane 160 which is disposed closer to the interior space S1 than the pressure valve 150 in the passageway W10 and is gas permeable. Consequently, when the energy storage devices 400 generate gas due to, for example, a malfunction, and the pressure in the interior space S1 of the outer housing 200 rises above the predetermined pressure, the pressure valve 150 enters the second state. In this case, since the pressure valve 150 is in the second state and the functional membrane 160 is always gas permeable, gas can be discharged out to the exterior space S2. Moreover, since the pressure valve 150 is in the first state under normal circumstances, it is possible to keep the interior space S1 of the outer housing 200 in a hermetically sealed state and possible to prevent foreign matter from entering the interior space S1 from the exterior space S2 exterior to the outer housing 200. When, for example, a given water pressure is applied to the communication part 130, such as when the energy storage apparatus 100 is submersed, even though inflow of water is difficult to prevent with the pressure valve 150, the inflow of water can be prevented with the functional membrane 160, which does not allow passage of liquid, so water can be prevented from flowing into the interior space S1 of the outer housing 200 even when a given water pressure is applied to the communication part 130. Moreover, it is possible to prevent water from reaching the functional membrane 160 with the pressure valve 150 when high-pressure water sprays in the vicinity of the energy storage apparatus 100 from, for example, a pressure washer. This makes it possible to prevent damage to the functional membrane 160 from high-pressure water. Consequently, the energy storage apparatus 100 can prevent water from entering the interior space S1 of the outer housing 200, and can thus prevent the energy storage devices from short circuiting.

With the energy storage apparatus 100 according to Embodiment 1, the communication part 130A is made of two components: the first component 211 which defines the half of the communication part 130A closer to the interior space S1 and the second component 140 which defines the other half of the communication part 130A closer to the exterior space S2 and holds the pressure valve 150. The functional membrane 160 is held in place by being sandwiched between the first component 211 and the second component 140. Thus, it is possible to dispose the functional membrane 160 in the passageway W10 in a position closer to the interior space S1 than the pressure valve 150 with a simple configuration.

With the energy storage apparatus 100 according to Embodiment 1, since the first component 211 and the second component 140 screw together, it is possible to securely couple the first component 211 and the second component 140 with a simple configuration.

With the energy storage apparatus 100 according to Embodiment 1, the functional membrane 160 is held in place by being sandwiched between the inner face 213 of the first component 211 and the end 142 of the second component 140. This makes it possible to securely hold the functional membrane 160 in place with a simple configuration.

With the energy storage apparatus 100 according to Embodiment 1, since the gasket 170 is disposed between the first component 211 and the second component 140, it is possible to more securely couple the first component 211 and the second component 140 together. This in turn makes it possible to prevent water from entering the interior of the outer housing 200 through the joint of the first component 211 and the second component 140 in the event of, for example, a given water pressure being applied to the communication part 130A, such as when the energy storage apparatus 100 is submersed.

Variation 1 of Embodiment 1

Figure 8:
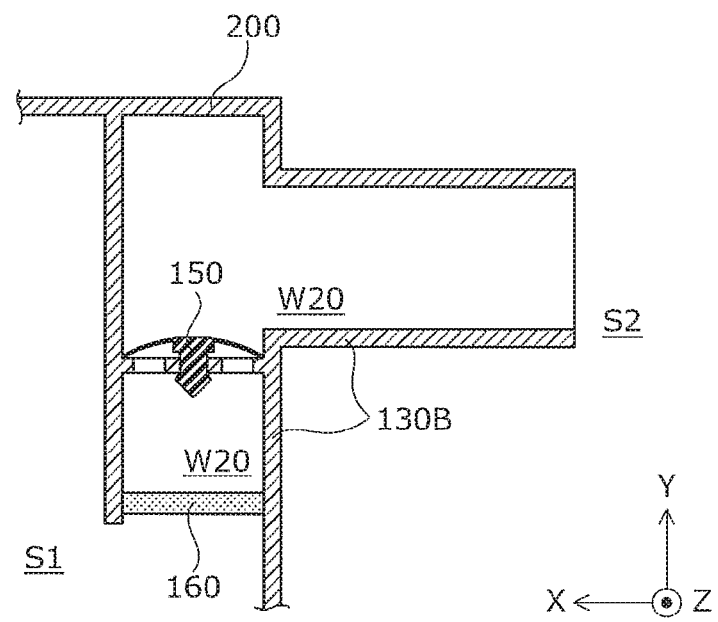
FIG. 8 illustrates the structure of a passageway according to Variation 1 of Embodiment 1.

With the energy storage apparatus 100 according to Embodiment 1, the communication part 130 extends outward from the outer housing 200 along the X axis, as is illustrated in FIG. 5. However, the energy storage apparatus 100 is not limited to this example. For example, as is illustrated in FIG. 8, the communication part 130 may be configured as a communication part 130B which defines an internal passageway W20 inside the interior of the outer housing 200. In this case, the communication part 130B includes an internal section in the interior the outer housing 200 in which the pressure valve 150 and the functional membrane 160 are disposed, and a protruding section protruding out from the outer housing 200. The protruding section is, for example, connected to the ventilation hose 500.

Figure 9:
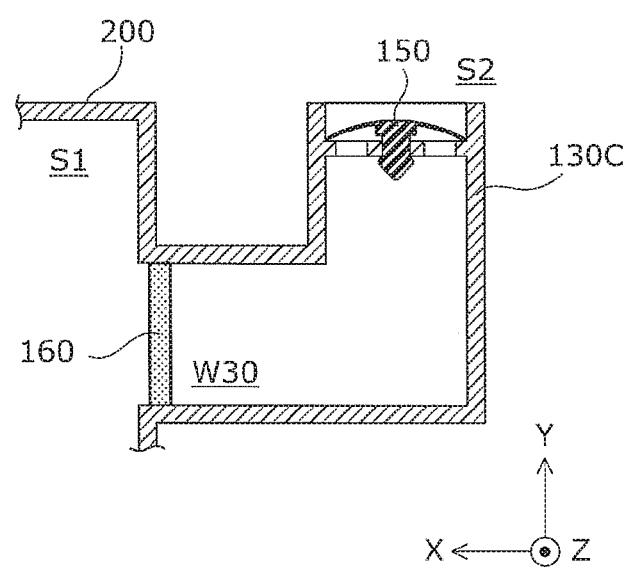
FIG. 9 illustrates the structure of a different passageway according to Variation 1 of Embodiment 1.

Moreover, the communication part 130 may be configured as a communication part 130C which defines a passageway W30 in which the pressure valve 150 and the functional membrane 160 are not disposed parallel to each other, as is illustrated in FIG. 9. In other words, as is illustrated in FIG. 9, the communication part 130C may include a bend between the pressure valve 150 and the functional membrane 160.

Variation 2 of Embodiment 1

With the energy storage apparatus 100 according to Embodiment 1, the communication part 130A couples together by the inner surface 212 of the first component 211 screwing together with the outer surface 141 of the second component 140, but the communication part 130A is not limited to this example. The inner surface of the second component and the outer surface of the first component may screw together to form the communication part 130A. In this case, the inner face that opposes the interior space S1 side end of the first component may be formed in the second component, and the functional membrane may be held in place between this end of the first component and the inner face of the second component. Furthermore, a gasket may be disposed between this end of the first component and the inner face of the second component.

In other words, when the first component and the second component are coupled by screwing together, it is sufficient if the outer surface of one of the first component and the second component and the inner surface of the other of the first component second component screw together.

When the first component and the second component are coupled together by the outer surface of one of the first component and the second component seating with the inner surface of the other of the first component and the second component, it is sufficient if the inner face that opposes the end of the one of the components is formed in the other of the components, and the functional membrane is held in place between this end of the one of the components and the inner face of the other of the components.

Variation 3 of Embodiment 1

With the energy storage apparatus 100 according to Embodiment 1, the first component 211 and the second component 140 are coupled by screwing together, but they may be coupled by means other than screwing such as an adhesive, a snap fit, a press fit, a flange, welding, or another means.

It should be noted that a configuration in which the first component and the second component are coupled together the by outer surface of one of the first component and the second component seating with the inner surface of the other of the first component and the second component may be applied to Variation 3 of Embodiment 1, similar to Variation 2 of Embodiment 1. In other words, a configuration in which the inner face that opposes the end of the one of the first component and the second component is formed in the other of the first component and the second component, and the functional membrane is held in place between the end of the one of the first component and the second component and the inner face of the other of the first component and the second component may be applied to Variation 3 of Embodiment 1.

Variation 4 of Embodiment 1

With the energy storage apparatus 100 according to Embodiment 1, the pressure valve 150 is disposed closer to the exterior space S2 than the functional membrane 160, but the pressure valve 150 is not necessarily required. In other words, even with a configuration in which the outer housing 200 does not include the pressure valve 150, since the functional membrane that allows the passage of gas and prohibits the passage of liquid is disposed in the communication part, it is possible to prevent foreign matter, such as water, spraying on the communication part, from entering the interior of the outer housing through the passageway, and also possible to prevent water from flowing into the interior of the outer housing through the passageway if the energy storage apparatus 100 should become submersed, for example. However, it goes without saying that provision of both the functional membrane 160 and the pressure valve 150, such as the case with energy storage apparatus 100 according to in Embodiment 1, is preferable since this makes it possible to more reliably prevent spraying foreign matter, such as water, from entering the interior of the outer housing and water from flowing into the interior of the outer housing, compared to when just the functional membrane 160 is provided.

Embodiment 2

Next, a communication part according to Embodiment 2 will be described with reference to FIG. 4 and FIG. 10A. Embodiment 2 offers a different embodiment of the communication part 130 than the energy storage apparatus 100 according to Embodiment 1. In other words, only the structure of the communication part 130 is different, and as such, description of all other components will be omitted. FIG. 5A illustrates the structure of the communication part of the outer housing.

Figure 10A:
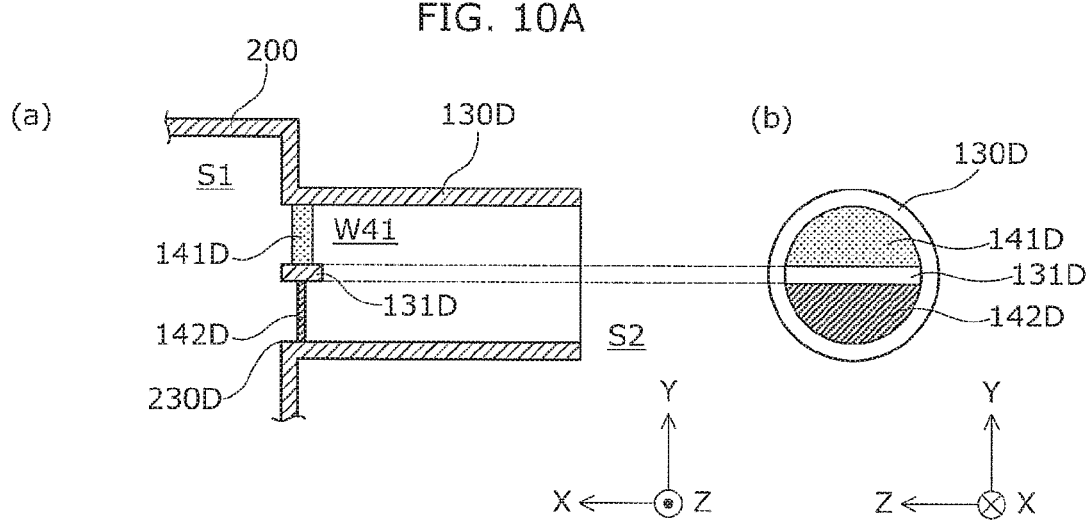
FIG. 10A illustrates the structure of a communication part of an outer housing according to Embodiment 2.

As is illustrated in FIG. 4 and FIG. 10A, the opening 230 of the outer housing 200 is sealed by a functional membrane 141D functioning as the first pressure adjuster and a water-resistant membrane 142D functioning as the second pressure adjuster arranged complementary to each other in a same plane. In other words, two pressure adjusters—the first pressure adjuster and the second pressure adjuster—are provided complementary to each other at the opening 230, which is one discharge port of the outer housing 200. The functional membrane 141D allows passage of gas and prohibits passage of liquid. The functional membrane 141D is made from the same material as the functional membrane 160 according to Embodiment 1. The water-resistant membrane 142D prohibits passage of gas and liquid, and breaks to release pressure in the outer housing 200 when the pressure exceeds a predetermined pressure. The water-resistant membrane 142D is a membrane made from known material, such as a resin film or a metallic foil. In this way, the water-resistant membrane 142D also functions as a safety valve since it breaks when gas generated by the energy storage devices 400 in the event of a malfunction fills the interior space S1 and the pressure in the interior space S1 exceeds a predetermined pressure, allowing communication between the interior space S1 and the exterior space S2 through the communication part 130. In other words, since the water-resistant membrane 142D breaks in the event of a malfunction, gas generated by the energy storage devices 400 can be released from of the interior space S1 of the outer housing 200 to the exterior space S2 through the communication part 130, as indicated by the arrows in FIG. 4.

(a) in FIG. 10A is a cross-sectional view of the opening 230 and the communication part 130 taken along line a-a in FIG. 3. In other words, opening 230D, communication part 130D, and passageway W41 in FIG. 10A are embodiments of the opening 230, the communication part 130, and the passageway W10 illustrated in FIG. 1 through FIG. 4. (b) in FIG. 10A illustrates the communication part 130D as viewed from the outside along the X axis.

The opening 230D includes a divider 131D, as is illustrated in FIG. 10A. In other words, the opening 230D is divided into two regions by the divider 131D. The functional membrane 141D occupies the region extending from the divider 131D of the opening 230D in the positive direction of the Y axis, and the water-resistant membrane 142D occupies the region extending from the divider 131D of the opening 230D in the negative direction of their axis. It should be noted that in Embodiment 2, the divider 131D divides the opening 230D into two equal halves.

It should be noted that the communication part 130D defining the passageway W41 is disposed around the opening 230D of the outer housing 200, on the exterior side of the outer housing 200. The opening 230D is provided on the interior space S1 side end of the passageway W41. In other words, since it is possible to say that the divider 131D is disposed in the passageway W41, it is also possible to say that the functional membrane 141D and the water-resistant membrane 142D are disposed complementary to each other in a same plane in the passageway W41.

Since the energy storage apparatus according to Embodiment 2 includes the functional membrane 141D which permits the passage of gas and prohibits the passage of liquid through the opening 230, and the water-resistant membrane 142D which prohibits the passage of gas and liquid, the energy storage apparatus according to Embodiment 2 can prevent water from entering the interior of the outer housing through the opening 230. Consequently, the energy storage apparatus can prevent the energy storage devices from short circuiting due to water entering the interior of the outer housing 200.

Moreover, even if the pressure fluctuates in the interior space S1 of the outer housing 200 due to a change in temperature or ambient pressure, since the functional membrane 141D allows the passage of gas, pressure fluctuations in the outer housing 200 can be mitigated. In other words, water can be prevented from entering the interior of the outer housing 200 through the opening 230 and stress on the outer housing 200 can be mitigated.

When a large amount of gas is generated by the energy storage device 400 due to a malfunction, for example, the pressure in the outer housing 200 can easily exceed the predetermined pressure. More specifically, while the water-resistant membrane 142D is still intact, along with gas from inside the energy storage device 400, melted resin collects on and seeps in the gas permeable functional membrane 141D. The functional membrane 141D seeped with melted resin cools and hardens into a wall of resin since the functional membrane 141D is located away from the heat generated by the malfunction. This leads to a loss of permeability in the functional membrane 141D and an increase in pressure in the outer housing. When this pressure exceeds the predetermined pressure, the functional membrane 141D and the complementary water-resistant membrane 142D break. It goes without saying that even if the functional membrane 141D does not become a wall of hardened resin, the water-resistant membrane 142D will break if the pressure in the interior space S1 exceeds the predetermined pressure due the energy storage devices 400 generating more gas than what can pass through the functional membrane 141D. This makes it possible to efficiently discharge gas generated in the event of a malfunction from the opening 230 of the outer housing 200, since the water-resistant membrane 142D breaks when the pressure exceeds the predetermined pressure thereby clearing the opening 230.

With the energy storage apparatus according to Embodiment 2, since the functional membrane 141D and the water-resistant membrane 142D are disposed complementary to each other in a same plane in the single opening 230, it is possible to lead the gas to a discharge destination with a single ventilation hose 500, for example, on the opening 230. In other words, this configuration is simpler than providing each of the functional membrane 141D and the water-resistant membrane 142D with an individual discharge route, and thus reduces manufacturing costs.

Variation 1 of Embodiment 2

Figure 10B:
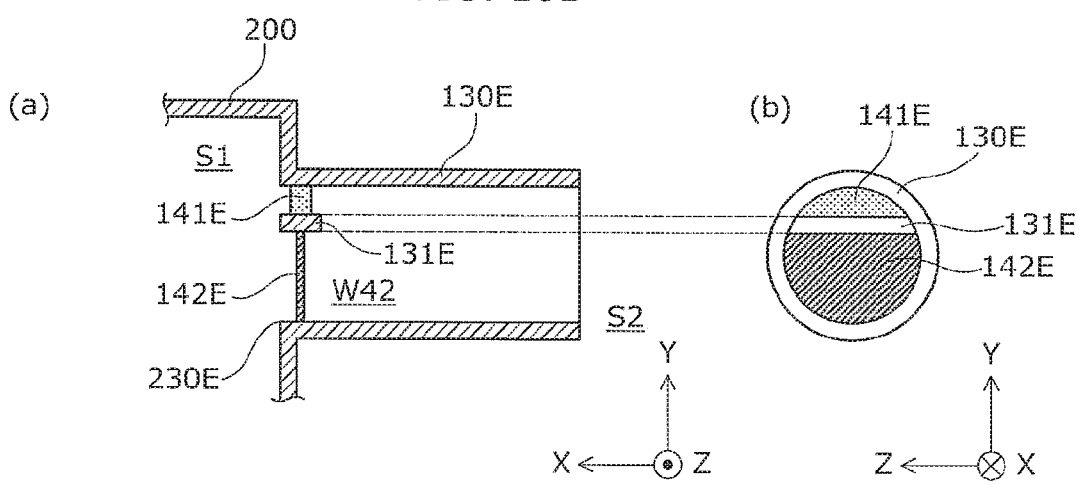
FIG. 10B illustrates the structure of a communication part of an outer housing according to Variation 1 of Embodiment 2.

FIG. 10B illustrates the structure of the opening and the communication part of the outer housing according to Variation 1 of Embodiment 2. It should be noted that (a) in FIG. 10B is a cross-sectional view of the opening 230 and the communication part 130 taken along line a-a in FIG. 3. In other words, opening 230E, communication part 130E, and passageway W42 in FIG. 10B are embodiments of the opening 230, the communication part 130, and the passageway W10 illustrated in FIG. 1 through FIG. 4. (b) in FIG. 10B illustrates the communication part 130E as viewed from the outside along the X axis.

As is illustrated in FIG. 10B, similar to the opening 230D according to Embodiment 2, the opening 230E is provided with a divider 131E that divides the opening 230E into two regions. However, with the opening 230E, the divider 131E is offset from the middle of the opening 230E in the Y axis direction so as to be positioned further in the positive direction of the Y axis. Here, the functional membrane 141E occupies the region extending from the divider 131E of the opening 230E in the positive direction of the Y axis, and the water-resistant membrane 142E occupies the region extending from the divider 131E of the opening 230E in the negative direction of the Y axis. In other words, with the opening 230E according to Variation 1 of Embodiment 2, the surface area of the functional membrane 141E facing the opening 230E is smaller than the surface area of the water-resistant membrane 142E facing the opening 230E.

It should be noted that the communication part 130E defining the passageway W42 is disposed around the opening 230E of the outer housing 200, on the exterior side of the outer housing 200. The opening 230E is provided on the interior space S1 side end of the passageway W42. In other words, since it is possible to say that the divider 131E is disposed in the passageway W42, it is also possible to say that the functional membrane 141E and the water-resistant membrane 142E are disposed complementary to each other in a same plane in the passageway W42.

With the opening 230E according to Variation 1 of Embodiment 2, since the functional membrane 141E permits the passage of gas even when the functional membrane 141E is smaller than the water-resistant membrane 142E, pressure fluctuation in the outer housing 200 due to a change in temperature or ambient pressure can be mitigated by the functional membrane 141E. Moreover, since the functional membrane 141E is gas permeable, when gas is generated in the event of a malfunction, melted resin tends to be carried by the gas and collect on the functional membrane 141E. When the melted resin attaches to the functional membrane and cools thereby making the functional membrane a hardened wall of resin, there is concern that the opening will be sealed off. By making the functional membrane 141E smaller than the water-resistant membrane 142E, the effect this resin carried by the gas has can be reduced. Furthermore, even when the functional membrane 141E is made to be smaller than the water-resistant membrane 142E, gas can efficiently escape from the opening 230E when pressure in the outer housing 200 exceeds the predetermined pressure since the water-resistant membrane 142E breaks and the opening 230E opens up.

Variation 2 of Embodiment 2

Figure 10C:
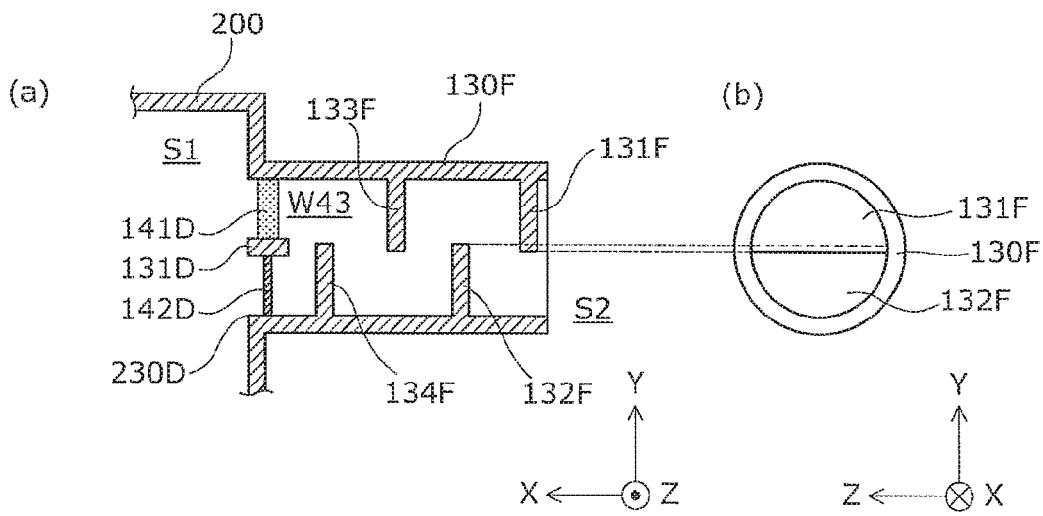
FIG. 10C illustrates the structure of a communication part of an outer housing according to Variation 2 of Embodiment 2.

FIG. 10C illustrates the structure of the opening and the communication part of the outer housing according to Variation 2 of Embodiment 2. It should be noted that (a) in FIG. 10C is a cross-sectional view of the opening 230 and the communication part 130 taken along line a-a in FIG. 3. In other words, opening 230D, communication part 130F, and passageway W43 in FIG. 10C are embodiments of the opening 230, the communication part 130, and the passageway W10 illustrated in FIG. 1 through FIG. 4. (b) in FIG. 10C illustrates the communication part 130F as viewed from the outside along the X axis.

As is illustrated in FIG. 10C, with Variation 2 of Embodiment 2, the communication part 130F is different from the communication part 130D and 130E according to Embodiment 2 and Variation 1 of Embodiment 2, and as such, the following description will focus on the structure of the communication part 130F. Since the configuration of the opening 230D is the same as the opening 230D according to Embodiment 2, description thereof is omitted.

The communication part 130F includes shield plates 131F through 134F, as is illustrated in FIG. 10C. The communication part 130F defines the passageway W43. The shield plates 131F and 133F are semicircle plates that, in a cross section taken along the axis of the communication part 130F, block the region extending from the top of the cross section to a position further below the central axis of the communication part 130F. The shield plates 132F and 134F are semicircle plates that, in a cross section taken along the axis of the communication part 130F, block the region extending from the bottom of the cross section to a position further above the central axis of the communication part 130F. In other words, when the communication part 130F is viewed along the X axis, the shield plates 131F through 134F are arranged so as to overlap each other.

Moreover, the shield plates 131F through 134F are disposed in mutually different positions along the X axis. In other words, the shield plates 131F through 134F are staggered in the communication part 130F. With this, the communication part 130F remains communicative from one end of the passageway W43 to the other.

In other words, the shield plates 131F through 134F can be said to include first shield plates and second shield plates. Here, the "first shield plate" refers to a shield plate that is arranged so as to obstruct a view through a first region of the passageway W43 when the communication part 130F is viewed along the X axis (first direction). Here, the first region is a portion of the passageway W43 in one direction along the Y axis (second direction intersecting the first direction). The "second shield plate" refers to a shield plate that is arranged so as to be offset along the X axis from the first shield plate and obstruct a view through a second region of the passageway W43 when the communication part 130F is viewed along the X axis. Here, the second region is a portion of the passageway W43 in the other direction along the Y axis. More specifically, among the shield plates 131F through 134F, the first shield plates are the shield plates 131F and 133F, and the second shield plates are the shield plates 132F and 134F.

In other words, when the communication part 130F is viewed along the X axis (when the communication part 130F is viewed from end to end), the shield plates 131F through 134F are arranged so as to mutually completely obstruct a view through the passageway. It should be noted that when the communication part is viewed along the X axis, a single shield plate may be provided instead of a plurality of shield plates so long as the shield plate is arranged so as to completely obstruct a view through the passageway.

Variation 3 of Embodiment 2

The openings 230D and 230E according to Embodiment 2 and Variations 1 and 2 thereof are circular, but the openings are not limited to a circular shape, and may be, for example, polygonal. As long as the functional membrane and the water-resistant membrane are provided so as to divide the opening into two regions, this shape is sufficient as well.

Variation 4 of Embodiment 2

With the energy storage apparatus according to Embodiment 2 and Variations 1, 2, and 3 thereof, the functional membranes 141D and 141E, which are first pressure adjusters, and the water-resistant membranes 142D and 142E, which are second pressure adjusters, are provided complementary to each other in a same plane in the openings 230D and 230E of the outer housing 200, but the second pressure adjuster is not limited to the water-resistant membrane 142D or 142E, and may be, for example, a reset pressure valve such as a umbrella valve. In other words, as a substitute for the water-resistant membranes 142D and 142E, the second pressure adjuster may be a pressure valve disposed in the openings 230D and 230E divided into a first region covered by the functional membranes 141D and 141E and a remaining second region, wherein the pressure valve is in a first state when pressure in the interior space S1 is a predetermined pressure or less and is in a second state when the pressure in the interior space S1 exceeds the predetermined pressure, the pressure valve sealing the second region in the first state and allowing communication between the interior space S1 and the exterior space S2 in the second region in the second state.

Embodiment 3

Figure 11A:
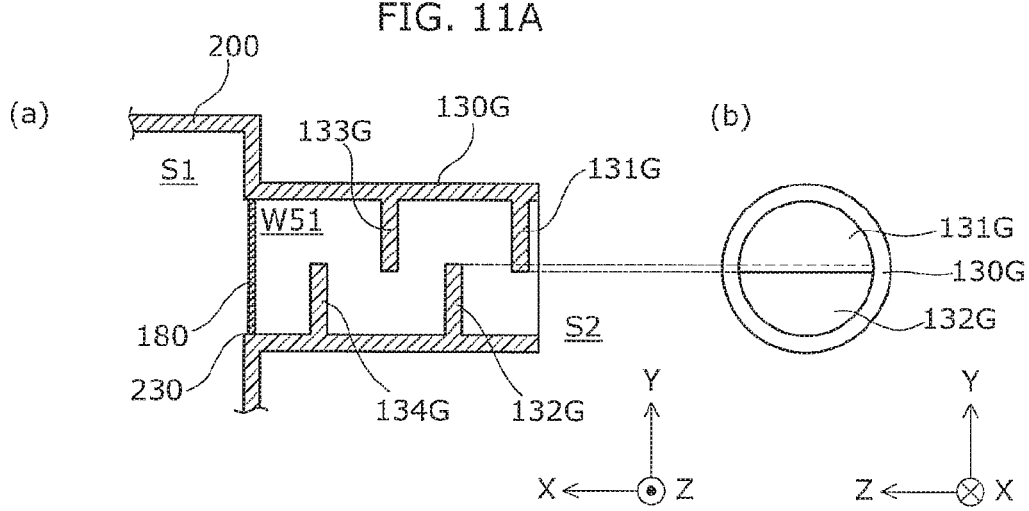
FIG. 11A illustrates the structure of a communication part of an outer housing according to Embodiment 3.

Next, a communication part according to Embodiment 3 will be described with reference to FIG. 4 and FIG. 11A. Embodiment 3 offers a different embodiment of the communication part 130 than the energy storage apparatus 100 according to Embodiment 1. In other words, only the structure of the communication part 130 is different, and as such, description of all other components will be omitted. FIG. 11A illustrates the structure of the communication part of the outer housing.

As is illustrated in FIG. 4 and FIG. 11A, a water-resistant membrane 180 is disposed adjacent to the interior space S1 in the passageway W10 (W51) of the outer housing 200. The water-resistant membrane 180 is a membrane made from known material, such as a resin film or a metallic foil, and prevents water from entering the interior of the outer housing 200. It should be noted that the water-resistant membrane 180 may be made from the same material as the functional membrane 160 according to Embodiment 1. Moreover, the water-resistant membrane 180 breaks when gas generated by the energy storage devices 400 in the event of a malfunction fills the interior space S1 and pressure in the interior space S1 exceeds the predetermined pressure, thereby allowing communication between the interior space S1 and the exterior space S2 through the passageway W10 (W51). In other words, the water-resistant membrane 180 also functions as a safety valve that allows communication between the interior space S1 and the exterior space S2 through the passageway W10 (W51) by breaking. In this way, since the water-resistant membrane 180 breaks in the event of a malfunction, gas generated by the energy storage devices 400 can be released from of the interior space S1 of the outer housing 200 to the exterior space S2 through the passageway W10 (W51), as indicated by the arrows in FIG. 4.

As is illustrated in FIG. 11A, the communication part 130G includes, as the shield component, shield plates 131G through 134G. It should be noted that (a) in FIG. 11A is a cross-sectional view of the communication part 130 taken along line a-a in FIG. 3. In other words, the communication part 130G and the passageway W51 in FIG. 11A are embodiments of the communication part 130 and the passageway W10 illustrated in FIG. 1 through FIG. 4. (b) in FIG. 11A illustrates the communication part 130G as viewed from the outside along the X axis.

The shield plates 131G and 133G are semicircle plates that, in a cross section taken along the axis of the passageway W51, block the region extending from the top of the cross section to a position further below the central axis of the passageway W51. The shield plates 132G and 134G are semicircle plates that, in a cross section taken along the axis of the passageway W51, block the region extending from the bottom of the cross section to a position further above the central axis of the passageway W51. In other words, when the communication part 130G is viewed along the X axis, the shield plates 131G through 134G are arranged so as to overlap each other in a region including the central axis of the passageway W51.

Moreover, the shield plates 131G through 134G are disposed in mutually different positions along the X axis. In other words, the shield plates 131G through 134G are staggered in the communication part 130G. With this, the communication part 130G remains communicative from one end of the passageway W51 to the other.

In other words, it can be said that the shield plates 131G through 134G include first shield plates and second shield plates. Here, the "first shield plate" refers to a shield plate that is arranged so as to obstruct a view through a first region of the passageway W51 when the communication part 130G is viewed along the X axis (first direction). Here, the first region is a portion of the passageway W51 in one direction along the Y axis (second direction intersecting the first direction). The "second shield plate" refers to a shield plate that is arranged so as to be offset along the X axis from the first shield plate and obstruct a view through a second region of the passageway W51 when the communication part 130G is viewed along the X axis. Here, the second region is a portion of the passageway W51 in the other direction along the Y axis. More specifically, among the shield plates 131G through 134G, the first shield plates are the shield plates 131G and 133G, and the second shield plates are the shield plates 132G and 134G.

In other words, when the communication part 130G is viewed along the X axis (when the communication part 130G is viewed from end to end), the shield plates 131G through 134G are arranged so as to mutually completely obstruct a view through the passageway.

With the energy storage apparatus according to Embodiment 3, the shield plates 131G through 134G are arranged in the communication part 130G of the outer housing 200 so as to completely obstruct a view through the passageway W51 when the communication part 130G is viewed along the X axis and maintain communication through the passageway W51. More specifically, when the communication part 130G is viewed along the X axis, the shield plates 131G through 134G are arranged in the communication part 130G so as to mutually completely obstruct a view through the passageway.

With this, when, for example, the energy storage apparatus 100 is installed in a vehicle and the vehicle is washed with a pressure washer, even if foreign matter, such as water, spraying toward the communication part 130G of the outer housing 200 of the energy storage apparatus 100 sprays in regions other than the region shielded by the outermost shield plate, the next shield plate can shield the spraying matter.

So long as the foreign matter does not change its course of travel in the communication part 130G and maneuver past the plurality shield plates 131G through 134G, the foreign matter will not enter the interior of the outer housing 200. As such, it is possible to reduce the possibility of foreign matter entering the interior of the outer housing 200 of the energy storage apparatus 100.

Consequently, the energy storage apparatus according to Embodiment 3 can prevent water from entering the interior of the outer housing 200, and can thus prevent the energy storage devices from short circuiting.

With the energy storage apparatus according to Embodiment 3, the communication part 130G includes the water-resistant membrane 180 disposed closer to the interior space S1 than the shield plates 131G through 134G.

Disposing the water-resistant membrane 180 in the communication part 130G makes it possible to prevent a large amount of water from flowing into the interior of the outer housing 200, which is difficult to prevent with the shield plates 131G through 134G. In other words, if the energy storage apparatus 100 should become submerged and a large amount of water flows into the communication part 130G, this inflow of water is difficult to stop with the shield plates 131G through 134G. However, the water-resistant membrane 180 can prevent the water from flowing into the interior of the outer housing 200 in this case.

Moreover, since the shield plates 131G through 134G are disposed closer to the exterior space S2 than the water-resistant membrane 180 in the communication part 130G of the outer housing 200, the shield plates 131G through 134G can protect the water-resistant membrane 180 from breaking if foreign matter, such as water, should directly spray on the communication part 130G with great force.

Variation 1 of Embodiment 3

Figure 11B:
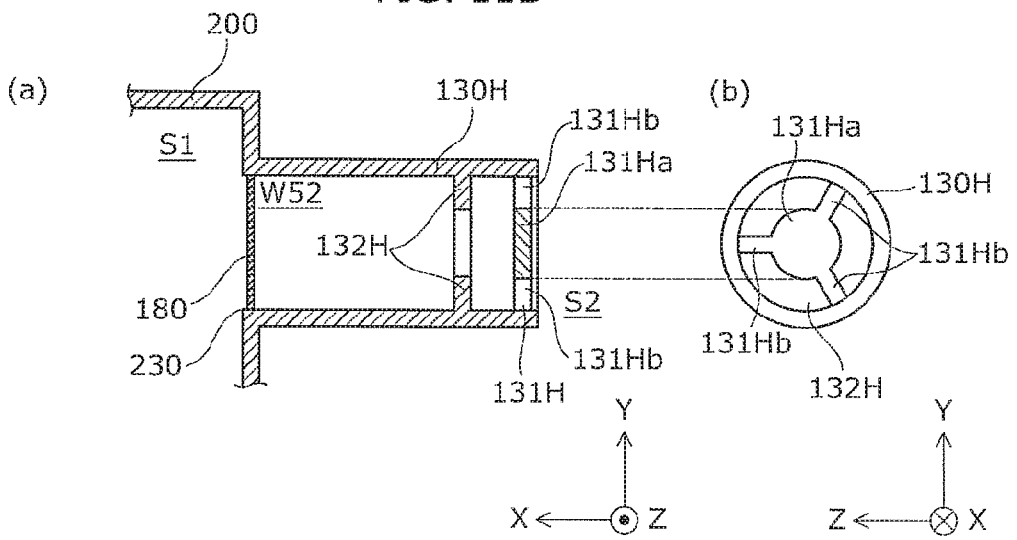
FIG. 11B illustrates the structure of a communication part of an outer housing according to Variation 1 of Embodiment 3.

FIG. 11B illustrates the structure of a communication part of the outer housing according to Variation 1 of Embodiment 3. It should be noted that (a) in FIG. 11B is a cross-sectional view of the communication part 130 taken along line a-a in FIG. 3. In other words, the communication part 130B and the passageway W52 in FIG. 11B are embodiments of the communication part 130 and the passageway W10 illustrated in FIG. 1 through FIG. 4. (b) in FIG. 11B illustrates the communication part 130B as viewed from the outside along the X axis.

As is illustrated in FIG. 11B, the communication part 130H includes, as the shield component, a shield plate 131H and a shield plate 132H. The communication part 130H defines the passageway W52. The shield plate 131H, which is disposed closer to the exterior space S2 than the shield plate 132H, includes a circular plate 131Ha disposed in the central region in a cross section taken along the axis of the communication part 130H, and connecting parts 131Hb that connect the circular plate 131Ha to the inner wall of the communication part 130H. The shield plate 132H, which is disposed closer to the interior space S1 than the shield plate 131H, is a ring-shaped plate-like component that extends from the inner wall of the communication part 130H toward the central axis of the communication part 130H. When the communication part 130H is viewed along the X axis, the outer circumference of the circular plate 131Ha of the shield plate 131H and the inner circumference of the shield plate 132H overlap so as to completely obstruct a view through the pathway.

In other words, it can be said that the shield plates 131H and 132H include the first shield plate and the second shield plate. Here, the "first shield plate" refers to a shield plate that is arranged so as to obstruct a view through a first region of the passageway W52 when the communication part 130H is viewed along the X axis. Here, the first region is a portion of the passageway W52 and includes the central axis of the passageway W52. The "second shield plate" refers to a shield plate that is arranged so as to be offset along the X axis from the first shield plate and obstruct a view through a second region of the passageway W52 when the communication part 130H is viewed along the X axis. Here, the second region is a portion of the passageway W52 and surrounds the first region. More specifically, the first shield plate is the shield plate 131H, and the second shield plate is the shield plate 132H.

Variation 2 of Embodiment 3

Figure 11C:
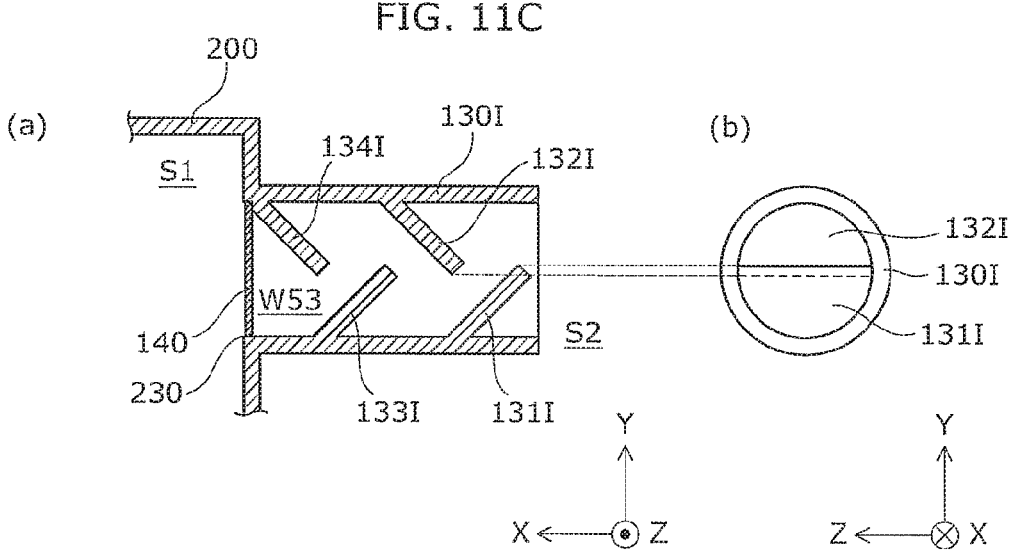
FIG. 11C illustrates the structure of a communication part of an outer housing according to Variation 2 of Embodiment 3.

FIG. 11C illustrates the structure of a communication part of the outer housing according to Variation 2 of Embodiment 3. It should be noted that (a) in FIG. 11C is a cross-sectional view of the communication part 130 taken along line a-a in FIG. 3. In other words, communication part 130I and passageway W53 in FIG. 11C are embodiments of the communication part 130 and the passageway W10 illustrated in FIG. 1 through FIG. 4. (b) in FIG. 11C illustrates the communication part 130I as viewed from the outside along the X axis.

As is illustrated in FIG. 11C, the communication part 130I includes, as the shield component, shield plates 131I through 134I. The communication part 130I defines the passageway W53. The shield plates 131I through 134I are disposed to so as to mutually completely obstruct a view through the passageway when the communication part 130 is viewed along the X axis, and inclined such that the free ends thereof are positioned further away from the outer housing 200 than corresponding fixed ends.

The shield plates 131I and 133I are semicircle plates that, in a cross section taken along the axis of the communication part 130I, block the region extending from the top of the cross section to a position further below the central axis of the passageway W53. The shield plates 131I and 133I are inclined such that the free ends near the center of the communication part 130I in the Y axis direction are positioned further away from the outer housing 200 (in the negative direction of the X axis) than the fixed ends connected to the inner wall of the communication part 130I.

The shield plates 132I and 134I are semicircle plates that, in a cross section taken along the axis of the communication part 130I, block the region extending from the bottom of the cross section to a position further above the central axis of the passageway W53. The shield plates 132I and 134I are inclined such that the free ends near the center of the communication part 130I in the Y axis direction are positioned further away from the outer housing 200 (in the negative direction of the X axis) than the fixed ends connected to the inner wall of the communication part 130I. In other words, the shield plates 131I and 133I and the shield plates 132I and 134I incline in intersecting directions.

With the communication part 130I according to Variation 2 of Embodiment 3, even if foreign matter, such as water, sprays into the communication part 130I, the communication part 130I makes it easier for foreign matter coming into contact with the shield plates 131I through 134I to move toward the fixed ends of the shield plates 131I through 134I. Since the fixed ends of the shield plate 131I through 134I block the path into the outer housing 200, foreign matter cannot enter the interior of the outer housing 200 unless it moves toward the free ends.

Moreover, forming the inner wall of the communication part 130I and each of the shield plates 131I through 134I to intersect at acute angles creates a space where foreign matter can collect on the outer side of the shield plates 131I through 134I. This makes it possible to trap foreign matter in this space if foreign matter should enter the communication part 130I. In other words, this structure makes it possible to further reduce the possibility of foreign matter entering the interior of the outer housing 200.

Variation 3 of Embodiment 3

Figure 11D:
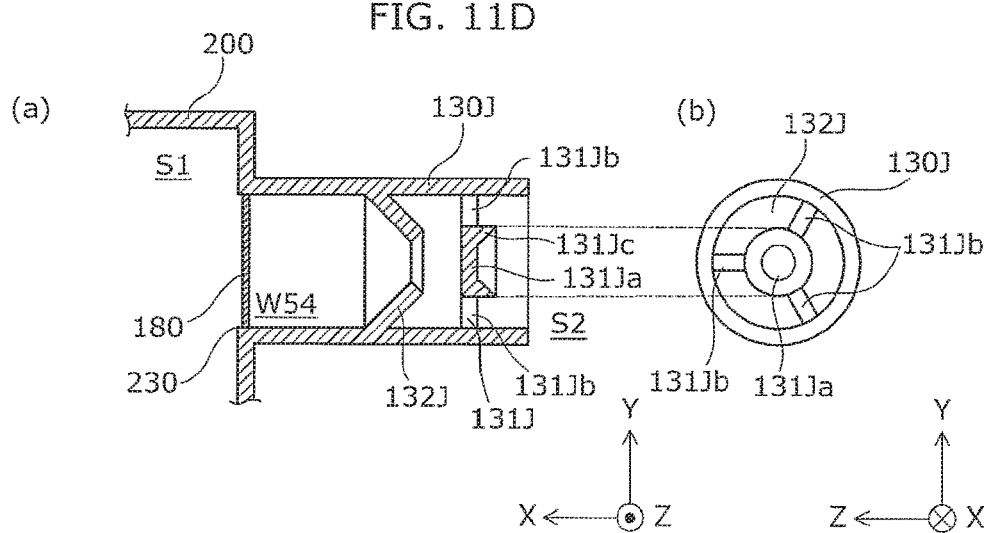
FIG. 11D illustrates the structure of a communication part of an outer housing according to Variation 3 of Embodiment 3.

It should be noted that the technical concept of Variation 2 of Embodiment 3 can be applied to the combination of the circular shield plate 131H and the ring-shaped shield plate 132H according to Variation 1 of Embodiment 3 to achieve a communication part 130J including, as the shield component, shield plates 131J and 132J, as is illustrated in FIG. 11D.

FIG. 11D illustrates the structure of the communication part of the outer housing according to Variation 3 of Embodiment 3. It should be noted that the communication part 130J and passageway W54 in FIG. 11D are embodiments of the communication part 130 and the passageway W10 illustrated in FIG. 1 through FIG. 4. (b) in FIG. 11D illustrates the communication part 130J as viewed from the outside along the X axis.

As is illustrated in FIG. 11D, the communication part 130J includes a shield plate 131J and a shield plate 132J. The communication part 130J defines the passageway W54. The shield plate 131J of the communication part 130J includes a circular plate 131Ja and a plurality of connecting parts 131Jb that connect the circular plate 131Ja to the inner wall of the communication part 130J. The circular plate 131Ja includes a rim 131Jc around the outer circumference.

On the other hand, the shield plate 132J is a ring-shaped plate-like component that extends from the inner wall of the communication part 130J toward the central axis of the passageway W54. The shield plate 132J inclines such that its free end near the central axis of the passageway W54, which defines the inner circumference of the shield plate 132J, is positioned further from the outer housing 200 (in the negative direction of the X axis) than its fixed end connected to the inner wall of the communication part 130J, which defines the outer circumference of the shield plate 132J.

Variation 4 of Embodiment 3

Figure 11E:
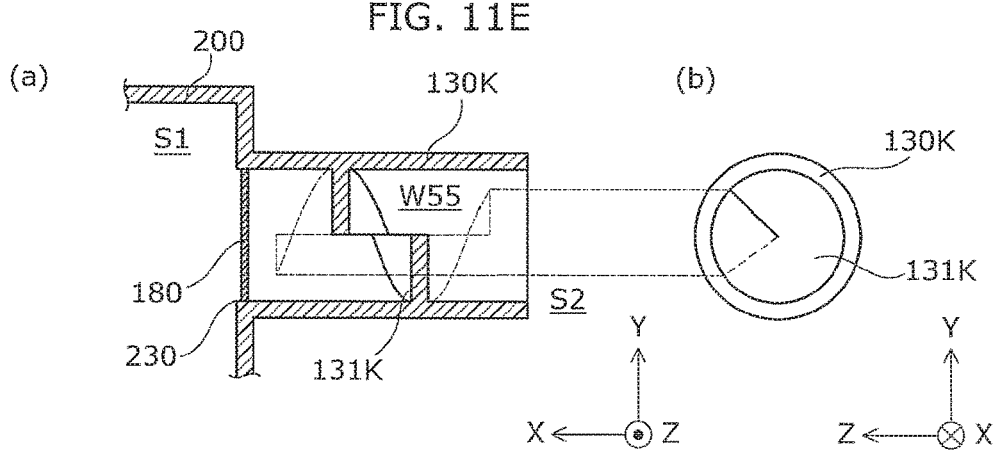
FIG. 11E illustrates the structure of a communication part of an outer housing according to Variation 4 of Embodiment 3.

FIG. 11E illustrates the structure of a communication part of the outer housing according to Variation 4 of Embodiment 3. It should be noted that (a) in FIG. 11E is a cross-sectional view of the communication part 130 taken along line a-a in FIG. 3. It should be noted that communication part 130K and passageway W55 in FIG. 11E are embodiments of the communication part 130 and the passageway W10 illustrated in FIG. 1 through FIG. 4. (b) in FIG. 11E illustrates the communication part 130K as viewed from the outside along the X axis.

As is illustrated in FIG. 11E, the communication part 130K is different from the communication parts 130G through 130J according to Embodiment 3 and Variations 1 through 3 thereof in that it includes a single shield plate 131K as the shield component. It should be noted that when the communication part is viewed along the X axis, a single shield plate may be provided instead of a plurality of shield plates so long as the shield plate is arranged so as to completely obstruct a view through the passageway. It should be noted that the communication part 130K defines the passageway W55.

More specifically, with the communication part 130K according to Variation 4 of Embodiment 3, the shield plate 131K is a helicoidal component that defines a helical space in the passageway W55. In other words, the shield plate 131K is shaped by the trajectory of a line-shaped component connecting the axis of the passageway W55 and the inner wall of the communication part 130K rotating about the axis of the passageway W55 completely one or more times while moving from one end of the passageway W55 to the other. In other words, even in this case, the communication part. 130K remains communicative from one end of the passageway W55 to the other.

As such, even if foreign matter, such as water, sprays into the communication part 130K, the foreign matter cannot enter the interior of the outer housing 200 so long as it does not rotate through the helical space in the communication part 130K defined by the helicoidal shield plate 131K. In other words, this structure makes it possible to further reduce the possibility of foreign matter entering the interior of the outer housing 200.

Variation 5 of Embodiment 3

Figure 11F:
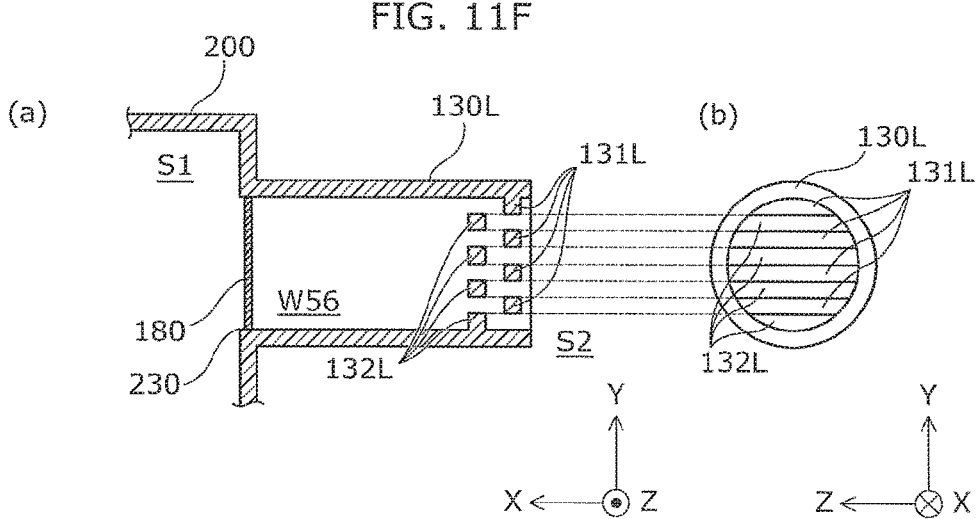
FIG. 11F illustrates the structure of a communication part of an outer housing according to Variation 5 of Embodiment 3.

FIG. 11F illustrates the structure of a communication part of the outer housing according to Variation 5 of Embodiment 3. It should be noted that (a) in FIG. 11F is a cross-sectional view of the communication part 130 taken along line a-a in FIG. 3. It should be noted that communication part 130L and passageway W56 in FIG. 11F are embodiments of the communication part 130 and the passageway W10 illustrated in FIG. 1 through FIG. 4. (b) in FIG. 11F illustrates the communication part 130L as viewed from the outside along the X axis.

As is illustrated in FIG. 11F, the communication part 130L is different from the communication parts according to Embodiment 3 and Variations 1 through 4 thereof. The communication part 130L includes, as the shield component, a plurality of first shield bars 131L (four in Variation 5 of Embodiment 3) and a plurality of second shield bars 132L (four in Variation 5 of Embodiment 3). The first shield bars 131L extend along the Z axis and are spaced apart from each other by a predetermined distance in the Y axis direction. The second shield bars 132L extend along the Z axis, are spaced apart from each other by a predetermined distance in the Y axis direction, and are disposed offset from the first shield bars 131L in the X axis direction. In other words, the first shield bars 131L and the second shield bars 132L are latticeworks. It should be noted that the first shield bars 131L and the second shield bars 132L that are in contact with the inner wall of the communication part 130L are integrally formed with the communication part 130L, but here they are presented as individual shield bars. The first shield bars 131L and the second shield bars 132L mutually fill in the gaps formed in the Y axis direction. In other words, the second shield bars 132L are disposed positionally corresponding to the predetermined gaps between the first shield bars 131L in the Y axis direction. That is to say, when the communication part 130L is viewed along the X axis, the first shield bars 131L and the second shield bars 132L mutually completely obstruct a view through the passageway.

Variation 6 of Embodiment 3

The communication parts 130G through 130K according to Embodiment 3 and Variations 1 through 4 thereof include, as the shield component, a plurality of shield plates 131G through 134G, 131H, 132H, 131I through 134I, 131J, 132J, or a single shield plate 131K, but the shield component is not limited to plate-like structures. For example, a protruding component that protrudes (bulges) from the inner circumference of the communication part toward the center of the passageway may be used, or a membrane-like component may be used. In other words, the shield component may be any component that obstructs a substance (for example air, water, or foreign matter) in the passageway from traveling in the communication part in the extending direction of the passageway (X axis direction), and is arranged such that communication is maintained through the passageway between the interior space S1 and the exterior space S2.

With this, since the communication part includes a shield component that obstructs passage of a substance in the passageway in the X axis direction and is arranged such that communication is maintained through the passageway between the interior and the exterior, it is possible to prevent foreign matter such as water splashing toward the passageway from entering the interior of the outer housing.

Variation 7 of Embodiment 3

In Embodiment 3 and Variation 2 thereof, four shield plates—the shield plates 131G through 134G and the shield plates 131I through 134I—are formed in the communication parts 130G and 130I. However, since any configuration is sufficient as long as no gap exists when the communication part is viewed along the X axis and communication is maintained through the communication part, a pair of two shield plates such as the shield plates 131G and 132G (131I and 132I) may be provided, a pair of two shield plates such as the shield plates 132G and 133G (132I and 133I) may be provided, or a pair of two shield plates such as the shield plates 133G and 134G (133I and 134I) may be provided as the shield component.

Variation 3 of Embodiment 8

The shield plates 131G through 134G and 131I through 134I according to Embodiment 3 and Variation 2 thereof are staggered in two regions each occupying roughly half of an axial cross section of the communication parts 130G and 130I, but the regions are not limited to occupying roughly equal portions. In other words, since any configuration is sufficient so long as the plurality of shield plates are arranged so as to overlap each other when the communication part is viewed along the X axis, the outermost shield plate may block the top third of the passageway in the positive direction of the Y axis, and the next shield plate may block the remaining bottom two-thirds of the passageway in the negative direction of the Y axis.

Variation 9 of Embodiment 3

The shield plates 131G through 134G, 131H, 132H, 131I through 134I, 131J, and 132J according to Embodiment 3 and Variations 1 through 3 thereof are arranged so as to overlap when the communication parts 130G through 130J are viewed along the X axis, but so long as the shield plates are arranged such that no gap is present when the communication parts 130G through 130J are viewed along the X axis, foreign matter, such as water, spraying directly in can be kept from entering, so the shield plates do not necessarily need to be overlapping. In other words, the shield plates 131G through 134G, 131H, 132H, 131I through 134I, 131J, and 132J may be configured such that the edges of the free ends thereof positionally match. Moreover, when viewed along the X axis, the shield plates do not strictly need to be arranged such that no gap exists.

Variation 10 of Embodiment 3

The communication parts 130G through 130K according to Embodiment 3 and Variations 1 through 5 thereof include the water-resistant membrane 180 near the interior space S1 of the outer housing 200, but provision of the water-resistant membrane 180 is not absolutely necessary. In other words, even when the outer housing 200 does not include the water-resistant membrane 180, since the shield plates 131G through 134G, 131H, 132H, 131I through 134I, 131J, and 132J, the shield plate 131K, and the first shield bars 131L and second shield bars 132L can shield foreign matter spraying directly in the passageway, provision of these alone is sufficient.

Other Embodiments

Hereinbefore, the energy storage apparatus according to the present invention has been described based on exemplary embodiments, but the scope of the present invention is not limited thereto. Various modifications of the exemplary embodiments as well as embodiments resulting from arbitrary combinations of constituent components of different exemplary embodiments that may be conceived by those skilled in the art are included within the scope of the present invention as long as these do not depart from the essence of the present invention.

(1)

The communication parts 130A through 130L according to Embodiments 1 through 3 and Variations thereof are cylindrical in shape, but this shape is not limiting; any shape is sufficient so long as the communication part is tubular. For example, the communication parts 130A through 130L may be a rectangular tube. In this case, since any configuration is sufficient so long as the shield plates overlap each other when the communication part is viewed along the X axis, the outer edge of the shield plates in contact with the inner wall of the communication part may be of a shape that corresponds to the inner wall of the communication part.

(2)

With the energy storage apparatus 100 according to Embodiments 1 through 3, the outer housing 200 houses the plurality of energy storage devices 400, but this configuration is not limiting; the outer housing 200 may house a single energy storage device 400.

(3)

The passageways W41 through W43 and W51 through W56 according to Embodiments 2 and 3 and Variations thereof extend in a straight line along the X axis, but this configuration is not limiting; the passageways may curve. In other words, so long as the passageway includes a shield plate that keeps foreign matter from traveling at least in the extending direction of the passageway, even a passageway that curves is included as an embodiment of the present invention. It should be noted that when the passageway curves, the angle of the curved portion of the passageway is not limited to a certain degree.

(4)

With Embodiment 1 and Variations 1 through 3 thereof as well as Variation 4 of Embodiment 2, an umbrella valve is used as the reset valve, but the reset valve is not limited to an umbrella valve. For example, a duckbill valve may be used.

The invention claimed is:

1. An energy storage apparatus, comprising:
one or more energy storage devices; and
an outer housing that houses the one or more energy storage devices,
wherein the outer housing includes an outer housing main body, a cover that closes an opening of the outer housing main body, an outer terminal disposed on the cover, and a communication part defining a passageway allowing a communication between an interior and an exterior of the outer housing,
wherein the communication part includes a functional membrane, a first component, and a second component,
wherein the first component defines a first pathway adjacent to the interior of the outer housing in the passageway,
wherein the second component defines a second pathway adjacent to the exterior of the outer housing in the passageway,
wherein the functional membrane is sandwiched between the first component and the second component, and
wherein the first component and the second component are coupled together by an outer surface of one of the first component and the second component being screwed together with an inner surface of another one of the first component and the second component.

2. The energy storage apparatus according to claim 1, wherein the communication part further includes a protruding section to which a ventilation hose is connected, the protruding section protruding from the outer housing.

3. The energy storage apparatus according to claim 2, wherein the protruding section is an integral part of the cover.

4. The energy storage apparatus according to claim 1, wherein the communication part further includes a pressure valve, which is in a first state when a pressure in the outer housing is equal to or less than a predetermined value and is brought into a second state when the pressure in the outer housing is more than the predetermined value.

5. The energy storage apparatus according to claim 1, wherein the functional membrane allows passage of a gas and prohibits passage of a liquid.

6. The energy storage apparatus according to claim 1, further comprising a shield plate disposed between the functional membrane and an end of the communication part, the shield plate partly blocking the passageway between the functional membrane and the end of the communication part.

7. The energy storage apparatus according to claim 6, wherein the shield plate comprises plural shield plates that overlap when viewed in a direction penetrating the shield plates.

8. The energy storage apparatus according to claim 6, wherein the shield plate comprises plural shield plates that overlap when viewed in a direction in which the communication part extends.

9. The energy storage apparatus according to claim 6, wherein the shield plate comprises plural shield plates that overlap when viewed in a direction in which the communication part longitudinally extends.

10. The energy storage apparatus according to claim 1, wherein the one or more energy storage devices comprises lithium-ion batteries, and
wherein the outer housing comprises a resin.

11. The energy storage apparatus according to claim 1, wherein the first component abuts a side surface of the functional membrane.

12. The energy storage apparatus according to claim 11, wherein the second component abuts another side surface of the functional membrane that faces away from the side surface of the functional membrane.

13. The energy storage apparatus according to claim 1, wherein the communication part includes a protruding section which longitudinally protrudes from the outer housing, and
wherein the functional membrane is located in the protruding section.

14. The energy storage apparatus according to claim 1, further comprising a plurality of shield plates disposed between the functional membrane and an end of the communication part,
wherein the shield plates overlap when viewed in a direction in which the communication part longitudinally extends.

15. An energy storage apparatus, comprising:
one or more energy storage devices; and
an outer housing that houses the one or more energy storage devices,
wherein the outer housing includes an outer housing main body, a cover that closes an opening of the outer housing main body, an outer terminal disposed on the cover, and a communication part defining a passageway allowing a communication between an interior and an exterior of the outer housing,
wherein the communication part includes:
a functional membrane; and
a protruding section which protrudes from the outer housing, and
wherein the functional membrane is arranged in the protruding section.

16. The energy storage apparatus according to claim 15, wherein the communication part further includes a first component and a second component,
wherein the first component defines a first pathway adjacent to the interior of the outer housing in the passageway,
wherein the second component defines a second pathway adjacent to the exterior of the outer housing in the passageway, and
wherein the functional membrane is sandwiched between the first component and the second component.

17. The energy storage apparatus according to claim 16, wherein the first component and the second component are coupled together by an outer surface of one of the first component and the second component being joined together with an inner surface of another one of the first component and the second component.

18. The energy storage apparatus according to claim 16, wherein the first component and the second component are coupled together by an outer surface of one of the first component and the second component being screwed together with an inner surface of another one of the first component and the second component.

19. An energy storage apparatus, comprising:
   one or more energy storage devices; and
   an outer housing that houses the one or more energy storage devices,
   wherein the outer housing includes an outer housing main body, a cover that closes an opening of the outer housing main body, an outer terminal disposed on the cover, and a communication part defining a passageway allowing a communication between an interior and an exterior of the outer housing,
   wherein the communication part includes a functional membrane and a shield plate disposed between the functional membrane and an end portion of the communication part,
   wherein the shield plate partly blocks the passageway between the functional membrane and the end portion of the communication part, and
   wherein the shield plate comprises plural shield plates that overlap when viewed in a direction in which the communication part extends.

20. The energy storage apparatus according to claim 19, wherein the direction in which the communication part extends includes a longitudinal direction of the communication part.

* * * * *